(12) United States Patent
Albright et al.

(10) Patent No.: US 11,312,027 B2
(45) Date of Patent: Apr. 26, 2022

(54) ROBOTIC GRIPPER

(71) Applicant: AEOLUS ROBOTICS CORPORATION LIMITED, Wan Chai (HK)

(72) Inventors: Tucker Albright, Jacksonville, FL (US); Gregg Podnar, Lakewood, OH (US)

(73) Assignee: AEOLUS ROBOTICS CORPORATION LIMITED, Wanchai (HK)

( * ) Notice: Subject to any disclaimer, the term of this patent is extended or adjusted under 35 U.S.C. 154(b) by 275 days.

(21) Appl. No.: 16/653,180

(22) Filed: Oct. 15, 2019

(65) Prior Publication Data
US 2021/0107170 A1  Apr. 15, 2021

(51) Int. Cl.
*B25J 15/12* (2006.01)
*B25J 15/10* (2006.01)

(52) U.S. Cl.
CPC ............ *B25J 15/12* (2013.01); *B25J 15/103* (2013.01); *B25J 15/106* (2013.01)

(58) Field of Classification Search
CPC ........ B25J 15/12; B25J 15/106; B25J 15/103; B25J 15/022
See application file for complete search history.

(56) References Cited

U.S. PATENT DOCUMENTS

| | | | |
|---|---|---|---|
| 7,258,379 B2* | 8/2007 | Ono | B25J 9/142 294/119.3 |
| 8,973,958 B2 | 3/2015 | Allen Demers et al. | |
| 8,991,885 B2* | 3/2015 | Claffee | B25J 15/0475 294/111 |
| 10,279,484 B2* | 5/2019 | Birglen | B25J 15/12 |
| 2005/0218679 A1* | 10/2005 | Yokoyama | B25J 15/10 294/99.1 |
| 2015/0028613 A1* | 1/2015 | Nakayama | B25J 15/0206 294/196 |
| 2015/0032152 A1* | 1/2015 | Frings | A61B 17/282 606/207 |

FOREIGN PATENT DOCUMENTS

JP   2018507116 A   3/2018

OTHER PUBLICATIONS

Odhner et al., "A Compliant, Underactuated Hand for Robust Manipulation," The International Journal of Robotics Research, 2014, vol. 33, Iss. 5, 29 pages.
Office Action and Search Report issued in JP2019-188691 dated Sep. 7, 2021 with English translation, 8 pages.

* cited by examiner

*Primary Examiner* — Stephen A Vu
(74) *Attorney, Agent, or Firm* — Muncy, Geissler, Olds & Lowe, P.C.

(57) ABSTRACT

The present disclosure relates to a robotic gripper comprising a body and two robotic fingers mounted to the body. Each robotic finger includes a first link, a second link, a third link, a fourth link, a first joint, a second joint and a third joint. The first joint connects the first link and the second link, and the second joint connects the second link and the third link, and the third joint connects the third link and the fourth link. These links and these joints are comprised of elastic material and are formed in one piece.

20 Claims, 31 Drawing Sheets

ROBOTIC GRIPPER

BACKGROUND

1. Field of the Invention

The instant disclosure relates to a fully-flexural robotic gripper, which can be configured to perform in pinch and conforming grasp modes.

2. Description of Related Art

Robotic grippers have been developed for various applications. Many grippers are designed for only one application—in other words, they may reliably grasp only specific classes of objects.

For example, in one of various operation modes, the so-called 'pinch grasp' mode, one contact surface of a finger of a gripper may be configured to be substantially in parallel to another contact surface of another finger of the gripper. In this pinch mode, the parallel surfaces of each finger will contact the object to be manipulated or moved. Grippers operating in this pinch mode are especially capable at picking up relatively small or light objects, and rectangularly shaped objects.

Another example of an operation mode is the conforming mode. In this mode, at least one finger may deform to conform to the contour of the object. Grippers operating in this conforming mode are especially capable at picking up objects having cylindrical contours, spherical contours, irregular contours or other odd contours.

Under-actuated mechanical systems, which may include springs, triggers, or linkages, may be integrated into a gripper so that it performs both pinch and conforming grasp modes. For example, under-actuation may be introduced into the gripper's fingers, whereby the fingers have relatively less actuators than degrees of freedom, allowing their appendages to both rigidly grip a flat surface or conform naturally to the surface of the object they grasp, depending on the specific design of the under-actuation.

U.S. Pat. No. 8,973,958, granted in 2015 to Robotiq, describes the design of and a method for designing a linkage-driven robotic gripper finger that can perform both pinch and encompassing grasps. The inventions of U.S. Pat. No. 8,973,958 are based on the academic teachings of several papers written between 2004 and 2011, authored by researchers at various Canadian universities. To paraphrase the academic document 'The kinematic preshaping of triggered self-adaptive linkage-driven robotic finger' (Birglen, 2011), by carefully selecting the lengths of each link, one can define a 'stable pinch region.' This stable grasp region, combined with a pre-shaping spring, allows the finger to grasp in a pinch mode when the spring is not engaged, and to grasp in an conforming mode when it is. However, the mechanical system proposed by U.S. Pat. No. 8,973,958 has its own limitations. It serves as a prime example of the downsides of traditional under-actuated finger designs, including but not limited to: the difficulty of mass production, part count and assembly cost, and robustness. Most notably however, is the restriction of the gripper's compliance to 2 dimensions (2D). Because the mechanical systems uses 'pin joints', which are a 1 degree of freedom rotational joint, configured to lie all in the same plane, the resulting compliance can only lie within that plane. There is no out-of-plane bending or deformation.

To improve the overall compliance of grippers, hands like the 'i-HY Hand' have been developed. The hand is a 2012 collaborative project between the company iRobot, Yale University, and Harvard University. The i-HY hand improves upon the core concept, introduced some years earlier by Professor Aaron Dollar of Yale University, of using 'flexural joints' instead of traditional pin joints in robotic grippers. Flexural joints are different from traditional pin joints because they are a 6 degree of freedom joint; they can rotate along 3 axes and deform along 3 axes, albeit in a non-linear fashion. This 3D compliance allows the fingers to conform to a wider array of objects than a gripper with rudimentary 2D compliance can. Yet, just like U.S. Pat. No. 8,973,958, existing 'flexural' gripper fingers have their own drawbacks. They are generally cable-driven, increasing their assembly time. They are generally in-molded, increasing manufacturing costs. And most importantly, they only are able to achieve conforming grasp modes. Because they do not have a 'stable pinch region', they cannot perform a true pinch grasp mode.

SUMMARY OF THE INVENTION

The instant disclosure relates to a robotic finger that is capable of performing both pinch and conforming grasp modes but is able to conform to objects in 3 dimensions. Because it may be made from a single piece of rubber, plastic, or other highly flexible material, it has a number of advantages over both existing linkage-driven and flexure-based under-actuated gripper fingers.

Because the robotic finger may be manufactured as a single part, both the manufacturing and assembly time costs are dramatically reduced. Manufacturing technologies like injection molding and hot-press molding can allow for the part to be mass-produced at relatively low cost.

Because the robotic finger may be comprised of a single piece of elastomeric material, it is inherently robust; it is physically resistant to bumps, vibrations, and shocks. Furthermore, the robotic finger is inherently waterproof—a growing requirement for marine robotic environments. In addition, the robotic gripper is easier to clean.

Most importantly, the robotic finger achieves both pinch and conforming grasp capability, while retaining all the advantages of flexural fingers. Because the geometry of the finger is designed with 6-axis forces and torques in mind, each of its joints can rotate in 3 dimensions and translate in 3 dimensions, albeit in a non-linear fashion. Similarly, each of its links can be considered as a rigid link in 3D space, depending on specific design parameters. This allows the finger to achieve both pinch and conforming grasp modes, much like existing linkage-driven under-actuated gripper designs. Additionally, it also allows the finger to achieve compliance in 3 dimensions, much like existing flexure-jointed under-actuated gripper designs.

The 'joint' and 'link' regions and the remaining details of the robotic gripper and finger are defined as follows.

According to one exemplary embodiment of the instant disclosure, a robotic finger includes a first link having a first end and a second end, a second link having a first end and at least one second end, at least one third link having a first end and a second end, a fourth link having at least one first end and a second end, a first joint between the second end of the first link and the first end of the second link, at least one second joint between the second end of the second link and the first end of the third link, and at least one third joint between the second end of the third link and the first end of the fourth link. The first, second, third and fourth links and the first, second and third joints include elastic material and are formed in one piece. As described above, manufacturing the finger as a single part as benefits for manufacturability, cost, and waterproofing.

According to another exemplary embodiment of the instant disclosure, a robotic finger includes a first link having a first end and a second end, a second link having a first end and at least one second end, at least one third link having a first end and a second end, a fourth link having at least one first end and a second end, a first joint between the second end of the first link and the first end of the second link, at least one second joint between the second end of the second link and the first end of the third link, and at least one third joint between the second end of the third link and the first end of the fourth link. The first, second, third and fourth links and the first, second and third joints are configured to be compliant in three dimensions. As described above, three-dimensional compliance allows the gripper to grasp a wider variety of oddly-shaped objects, and improves robustness.

According to another exemplary embodiment of the instant disclosure, a method for operating a robotic gripper includes providing a body which has a first driver, a first idle ground joint, a second driver and a second idle ground joint, providing a first robotic finger which includes a first link having a first end and a second end, a second link having a first end and at least one second end, at least one third link having a first end and a second end, a fourth link having at least one first end and a second end, a first joint between the second end of the first link and the first end of the second link, at least one second joint between the second end of the second link and the first end of the third link, and at least one third joint between the second end of the third link and the first end of the fourth link, wherein the first, second, third and fourth links and the first, second and third joints are configured to be compliant in three dimensions, and wherein the first end of the first link of the first robotic finger is mounted to one of the first driver and the first idle ground joint, the second end of the fourth link of the first robotic finger is mounted to the other one of the first driver and the first idle ground joint, providing a second robotic finger which includes a first link having a first end and a second end, a second link having a first end and at least one second end, at least one third link having a first end and a second end, a fourth link having at least one first end and a second end, a first joint between the second end of the first link and the first end of the second link, at least one second joint between the second end of the second link and the first end of the third link, and at least one third joint between the second end of the third link and the first end of the fourth link, wherein the first, second, third and fourth links and the first, second and third joints are configured to be compliant in three dimensions, and wherein the second end of the fourth link of the second robotic finger is mounted to one of the second driver and the second idle joint and the first end of the first link of the second robotic finger is mounted to the other one of the second driver and the second idle ground joint, and driving the first and second drivers so as to actuate the first and second robotic fingers to perform a pinch grasp or a conforming grasp of an object.

In order to further understand the instant disclosure, the following embodiments are provided along with illustrations to facilitate appreciation of the instant disclosure; however, the appended drawings are merely provided for reference and illustration, without any intention to limit the scope of the instant disclosure.

BRIEF DESCRIPTION OF THE DRAWINGS

Aspects of the present disclosure are readily understood from the following detailed description when read with the accompanying figures. It should be noted that various features may not be drawn to scale. In fact, the dimensions of the various features may be arbitrarily increased or reduced for clarity of discussion.

DETAILED DESCRIPTION OF THE PREFERRED EMBODIMENTS

Figure 1:
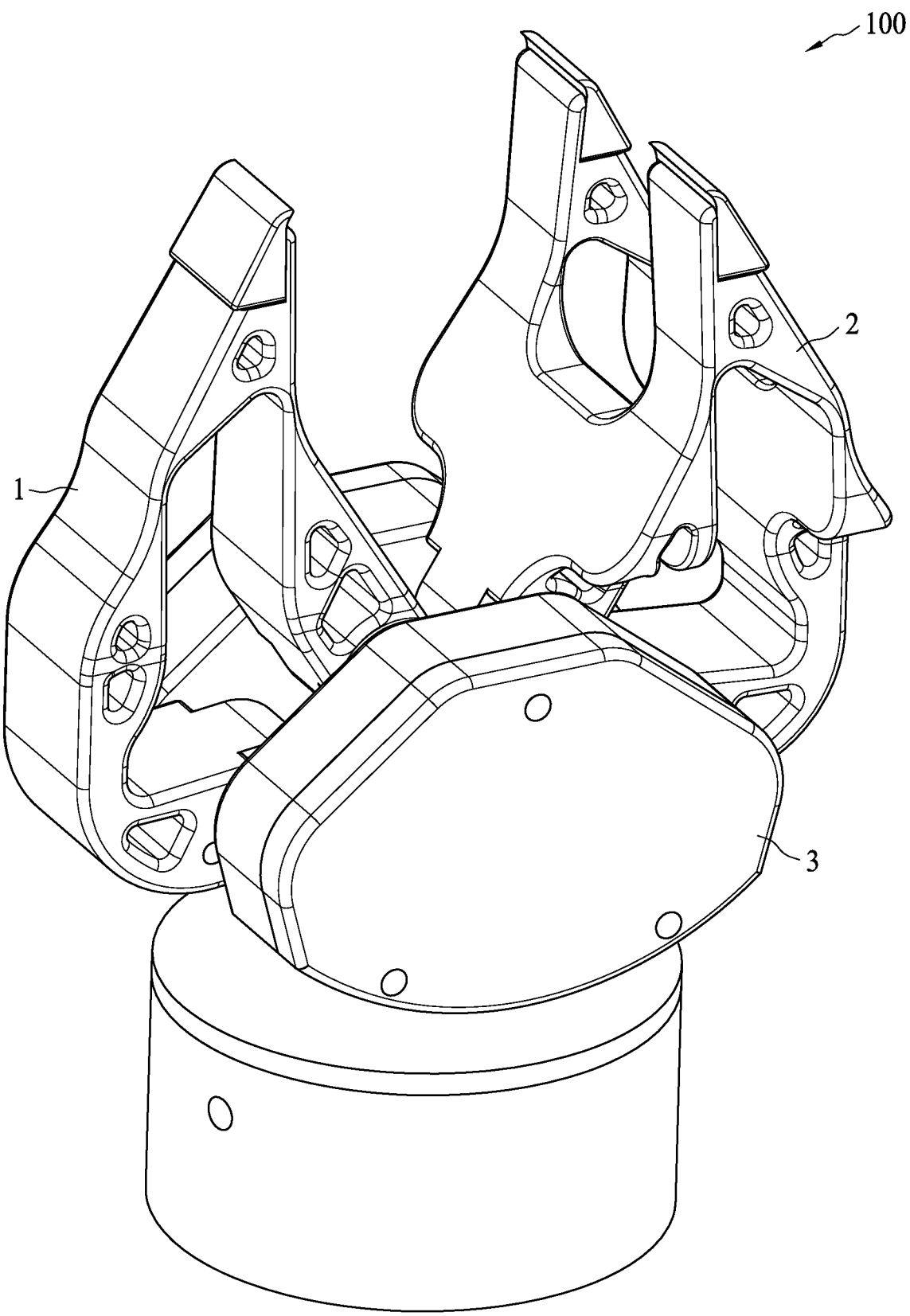
FIG. 1 is a perspective view of a robotic gripper in accordance with some embodiments of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The following disclosure provides for many different embodiments, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a perspective view of a robotic gripper 100 in accordance with some embodiments of the instant disclosure. The robotic gripper 100 may include a robotic finger 1, a robotic finger 2 and a body 3. The robotic finger 1 and the robotic finger 2 can be mounted to the body 3.

Figure 2A:
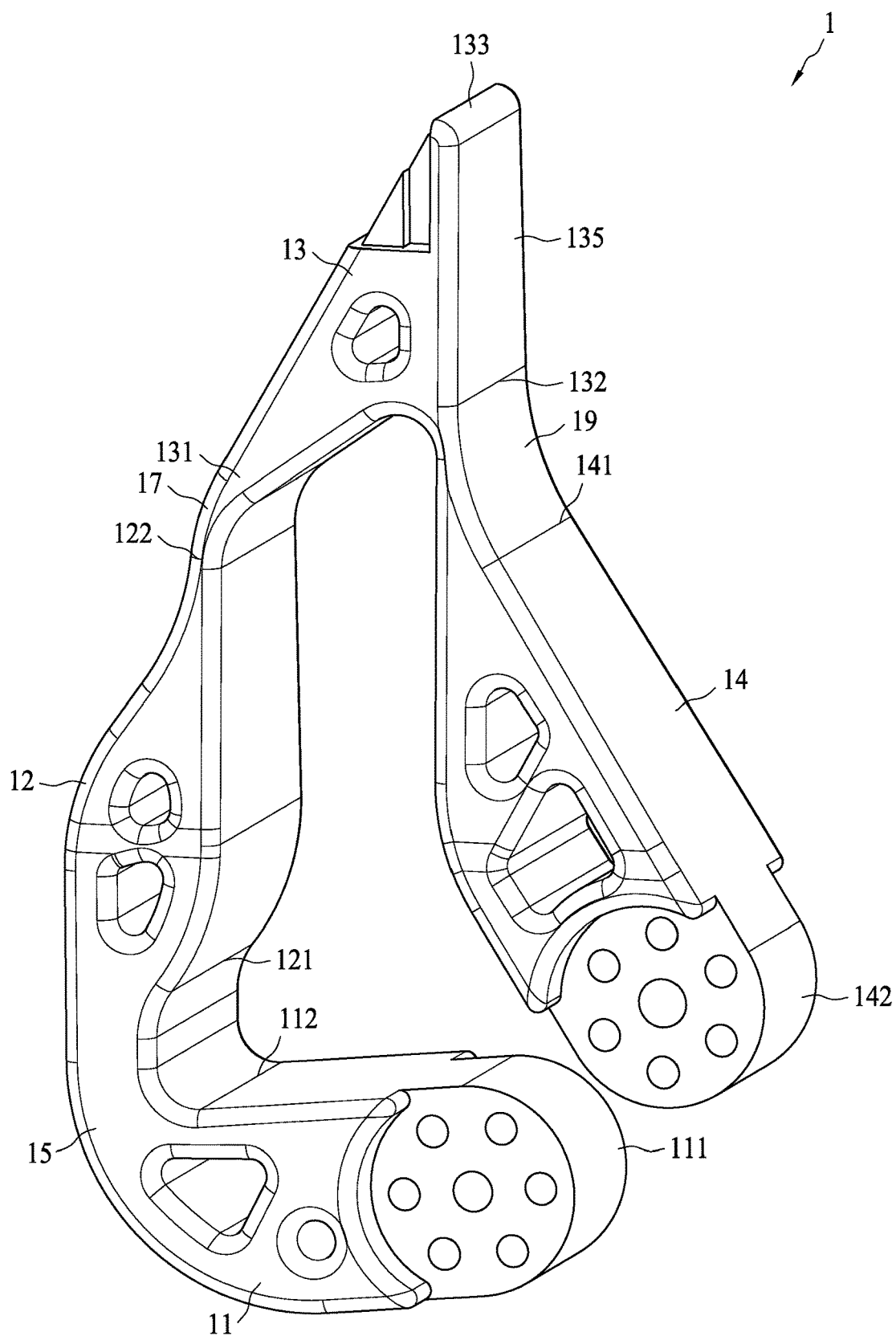
FIG. 2A is a perspective view of a robotic finger in accordance with some embodiments of the instant disclosure.

FIG. 2A is a perspective view of a robotic finger 1 in accordance with some embodiments of the instant disclosure. The robotic finger 1 may include four links 11, 12, 13 and 14 and three joints 15, 17 and 19. The link 11 may have two ends 111 and 112 which are opposite to each other. The link 12 may have two ends 121 and 122 which are opposite to each other. The link 13 may have three ends, 131, 132 and 133. The link 14 may have two ends 141 and 142, which are opposite to each other. The joint 15 may connect the end 112 of the link 11 and the end 121 of the link 12, and the joint 17 may connect the end 122 of the link 12 and the end 131 of the link 13, and the joint 19 may connect the end 132 of the link 13 and the end 141 of the link 14. These links 11, 12, 13 and 14 and these joints 15, 17 and 19 may include elastic material and are formed in one piece, and they are configured to be compliant in three dimensions.

Please note that the X, Y and Z axes described below use a three-dimensional Cartesian coordinate system. The positive Z-axis may extend in the general direction from the end 111 of the link 11 to the end 133 of the link 13 and can be interpreted to be substantially vertical in the primary linkage plane. The positive X-axis extends in the general direction from the end 142 of the link 14 to the end 112 of the link 11 and can be interpreted to be substantially horizontal in the primary linkage plane. The remaining Y axis is defined using the right-hand rule.

[Exemplary Bending Modes and Design Parameters]

At least three exemplary deformation modes for the gripper finger as discussed above are described below.

The first mode can be the bending of the finger in the primary linkage plane, the X-Z plane. Bending in the primary linkage plane allows for pinching and conforming grasps of objects. In order for the finger to be able to both pinch and conform, the spring strength of the first joint must be significantly greater than the spring strength of the second and third joints. However, the second and third joints should not be too thin practically, or else the gripper will not be robust or able to transmit high amounts of gripping force through the fingertip. These are but a few of the design considerations in the primary linkage plane.

The second mode can be what we call 'fingertip roll', or torsion of the finger about the Z-axis. Fingertip roll allows the surface of the fingertips to conform to objects that are not simple 2-D contours, but rather 3-D surfaces. To increase fingertip roll, the length of the second and third joints may be much greater than the thickness of the second and third joints. However, doing so comes at a price: out of plane deflection will be increased. As one can quickly see, changing one parameter to improve one deflection mode has ramifications for other deflection modes.

The third mode can be 'out-of-plane bending,' which is deflection along the Y-axis, or almost equivalently, bending about the X-axis. There is a balance required in this design space. Too much out of plane bending, and the gripper will not be able to lift anything heavy; it will flop over and be too limp. Too little out of plane bending, and the gripper will not be robust to out of plane shocks or bumps and it will be prone to breakage, much like existing linkage-driven underactuated grippers.

Achieving the appropriate amount of deformation for each critical mode requires careful consideration of the design parameters of the finger. The modes are all interrelated and changing one physical parameter will have different effects on all modes. The specifics below are the parameters we have theoretically and empirically found that work best for our use cases.

Figure 2B:
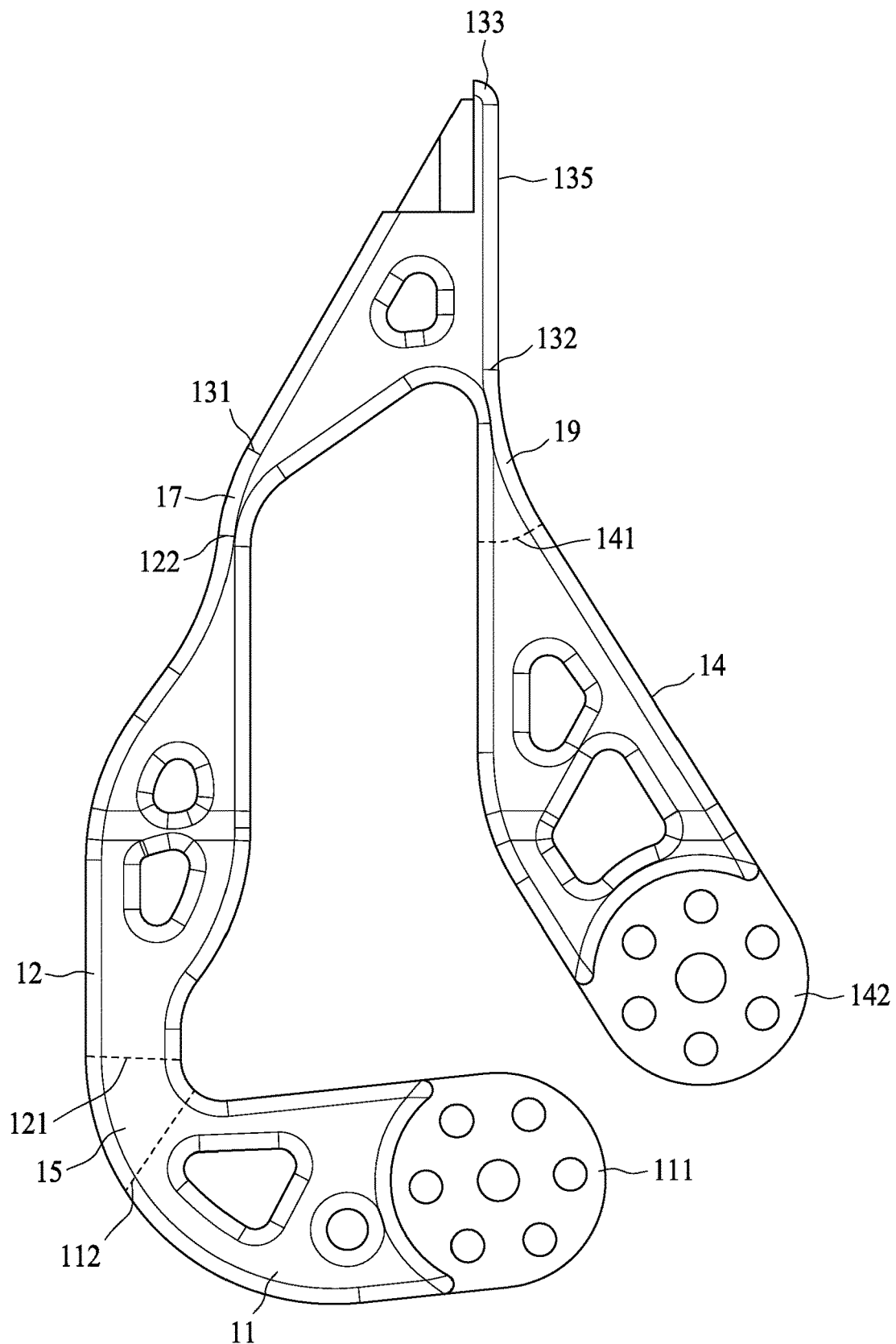
FIG. 2B is a top view of a robotic finger in accordance with some embodiments of the instant disclosure.

FIG. 2B is a top view of a robotic finger 1 in accordance with some embodiments of the instant disclosure. With reference to FIG. 2B, the thickness of the end 112 of the link 11 and the thickness of the end 121 of the link 12 may be greater than the smallest thickness of the joint 15. The thickness of the end 122 of the link 12 and the thickness of the end 131 of the link 13 may be greater than the smallest thickness of the joint 17. The thickness of the end 132 of the link 13 and the thickness of the end 141 of the link 14 may be greater than the smallest thickness of the joint 19. That is, the thickness of the link 11, 12, 13 or 14 may be greater than the thickness of the joint 15, 17 or 19 to which it connects. In one embodiment, the smallest thickness of the joint 17 or joint 19 may be around 2.5 mm. Especially, the largest thickness of the link 12 may be about 9 times greater than or equal to the smallest thickness of the joint 17, and the largest thickness of the link 14 may be about 9 times greater than or equal to the smallest thickness of the joint 19. In one embodiment, the largest thickness of the link 12 and the largest thickness of the link 14 may be greater than or equal to 22.5 mm. Further, since the thickness of the joint 15, 17, 19 may be substantially smaller than the thickness of the link 11, 12, 13, 14, the joint 15, 17, 19 will be more flexible and deformable than the link 11, 12, 13, 14. The joint 15, 17, 19 will act as a joint connecting to two links. Referring to FIG. 2B, the joint 15 will act as a joint connecting the links 11 and 12, the joint 17 will act as a joint connecting the links 12 and 13, and the joint 19 will act as a joint connecting the links 13 and 14.

The joints 15, 17 and 19 can be considered as joints with rotation around out-of-plane axes as having a low spring rate, and rotation about in-plane axes as having a high spring rate. Further, the links 11, 12, 13 and 14 while more rigid (not entirely rigid) also may rotate/bend in three axes with various spring rates that are generally higher than the join spring rates. This is a novel aspect of these gripper fingers that allow multiple modes of conformance with a grasped object.

Since the joints 15, 17 and 19 may include elastic material, the spring stiffness of the joints 15, 17 and 19 could be designed by selecting the thicknesses of the joints 15, 17 and 19. As shown in FIG. 2B, the smallest thickness of the joint 15 may be greater than the smallest thickness of the joint 17, and greater than the smallest thickness of the joint 19. That is, the spring stiffness of the joint 15 may be greater than the spring stiffness of the joint 17 and the spring stiffness of the joint 19. In addition, the smallest thickness of the joint 15 may range from two times the smallest thickness of the joint 17 to five times the smallest thickness of the joint 17, or a range from two times the smallest thickness of the joint 19 to five times the smallest thickness of joint 19. In one embodiment, the smallest thickness of the joint 15 may range from 5 mm to 12.5 mm.

Referring to FIGS. 2A and 2B, the link 13 may have a side surface 135 between the ends 132 and 133, and the side surface 135 may be substantially flat.

Figure 2C:
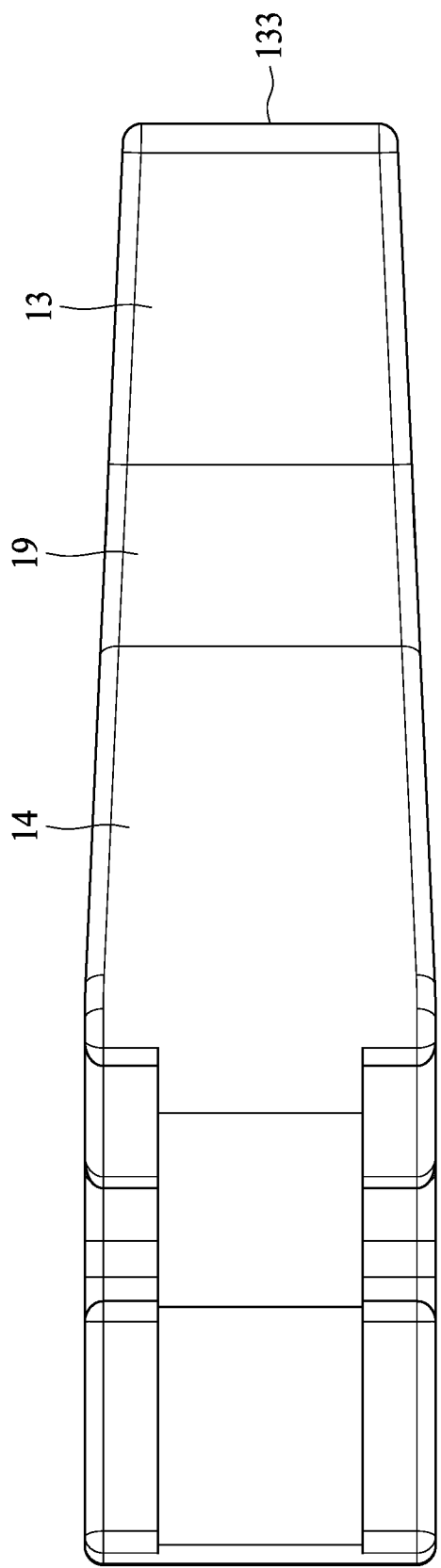
FIG. 2C is a right side view of a robotic finger in accordance with some embodiments of the instant disclosure.
Figure 2D:
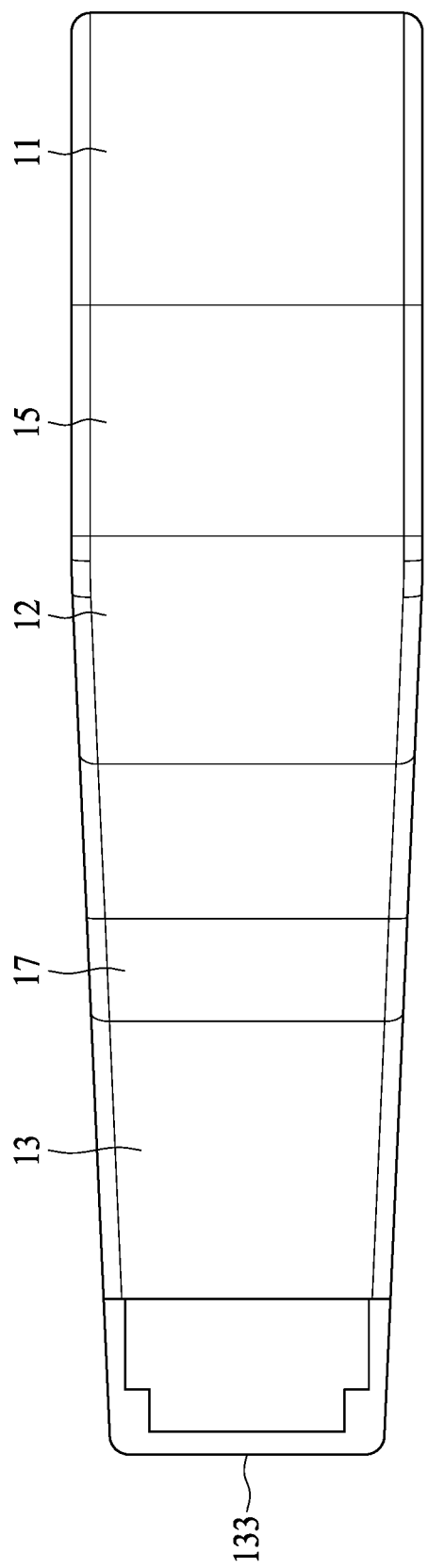
FIG. 2D is a left side view of a robotic finger in accordance with some embodiments of the instant disclosure.

FIGS. 2C and 2D are a right side view and a left side view respectively of a robotic finger 1 in accordance with some embodiments of the instant disclosure. As shown in FIGS. 2C and 2D, the finger 1 may be substantially tapered. Referring to FIG. 2C, the width of the link 14 may be substantially tapered toward the joint 19, and the width of the joint 19 may be substantially tapered toward the link 13, and the link 13 may be substantially tapered toward its end 133. Moreover, referring to FIG. 2D, the width of the link 12 is substantially tapered toward the joint 17 and the width of the joint 17 is substantially tapered toward the link 13. The width of the robotic finger 1 may range from eight times the smallest thickness of the joint 17 to twelve times the smallest thickness of the joint 17, or range from eight times the smallest thickness of the joint 19 to twelve times the smallest thickness of the joint 19. In one embodiment, the width of the robotic finger 1 may range from 20 mm to 30 mm.

The total length of the finger 1, such as the distance from the right side of the link 11 to the left side of the link 13 as shown in FIG. 2D, may range from thirty times the smallest thickness of the joint 17 to fifty times the smallest thickness of the joint 17, or range from thirty times the smallest thickness of the joint 19 to fifty times the smallest thickness of the third joint 19. In one embodiment, the total length of the robotic finger 1 may range from 75 mm to 125 mm.

In addition, the length of the joint 17 may range from three times the smallest thickness of the joint 17 to six times the smallest thickness of the joint 17, and the length of the joint 19 may range from three times the smallest thickness of the joint 19 to six times the smallest thickness of the joint 19. In one embodiment, the length of the joint 17 and the length of the joint 19 may range from 7.5 mm to 15 mm.

Figure 3A:
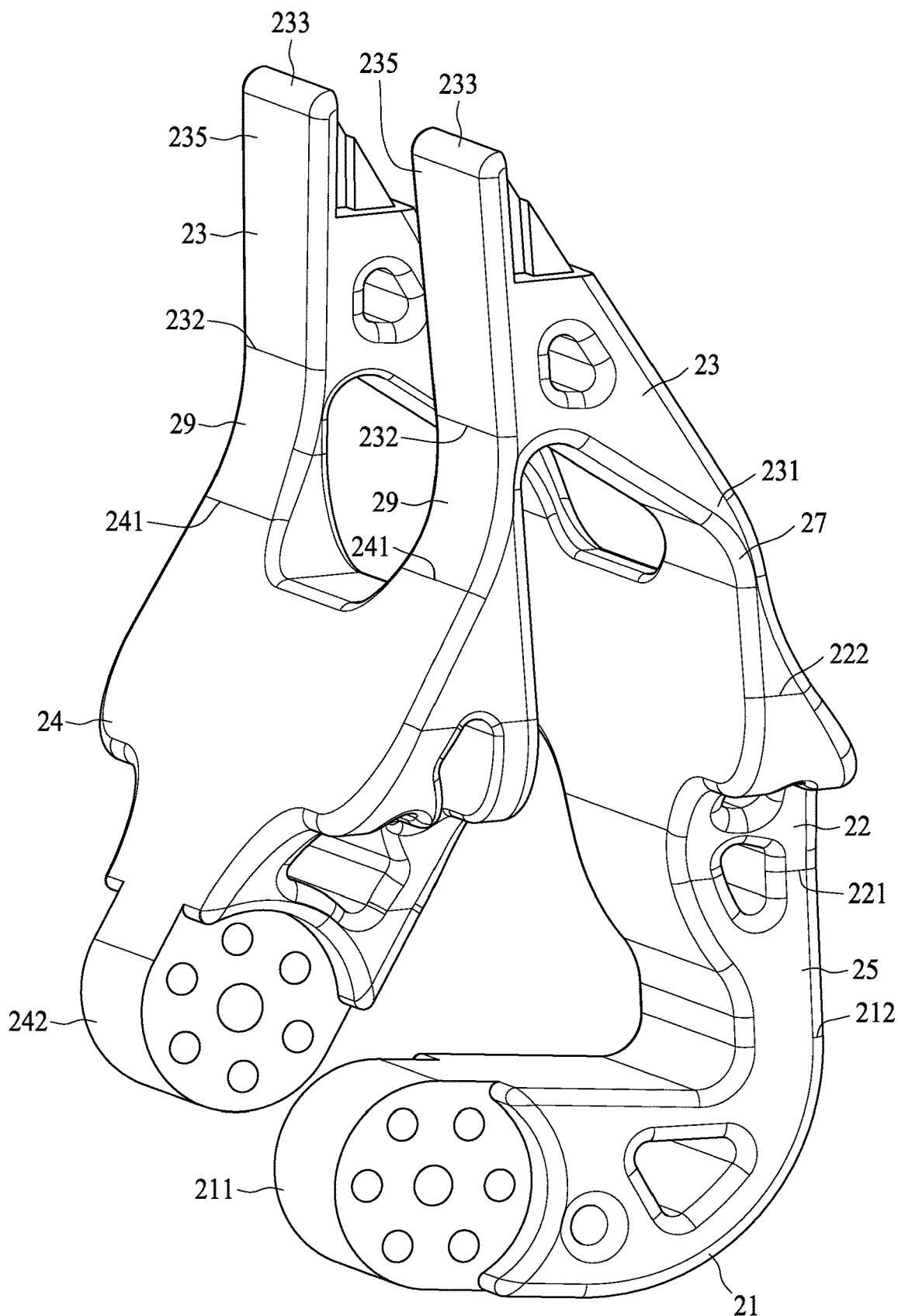
FIG. 3A is a perspective view of a robotic finger in accordance with another embodiment of the instant disclosure.

FIG. 3A is a perspective view of a robotic finger 2 in accordance with another embodiment of the instant disclosure. The robotic finger 2 may include five links 21, 22, 23 and 24 and five joints 25, 27 and 29. The link 21 may have two ends 211 and 212 which are opposite to each other. The link 22 may have one end 221 and two ends 222 opposite to the end 221 and projecting in a branch-shape. Each of two links 23 may have three ends 231, 232 and 233. The link 24 has one end 242 and two ends 241 opposite to the end 242 and projecting in a branch-shape. The joint 25 may connect the end 212 of the link 21 and the end 221 of the link 22. Two joints 27 may respectively connect the ends 222 of the link 22 and the ends 231 of the links 23. Two joints 29 may respectively connect the ends 232 of the links 23 and the ends 241 of the link 24. These links 21, 22, 23 and 24 and these joints 25, 27 and 29 may include elastic material and are formed in one piece, and thus they are configured to be compliant in three dimensions.

Figure 3B:
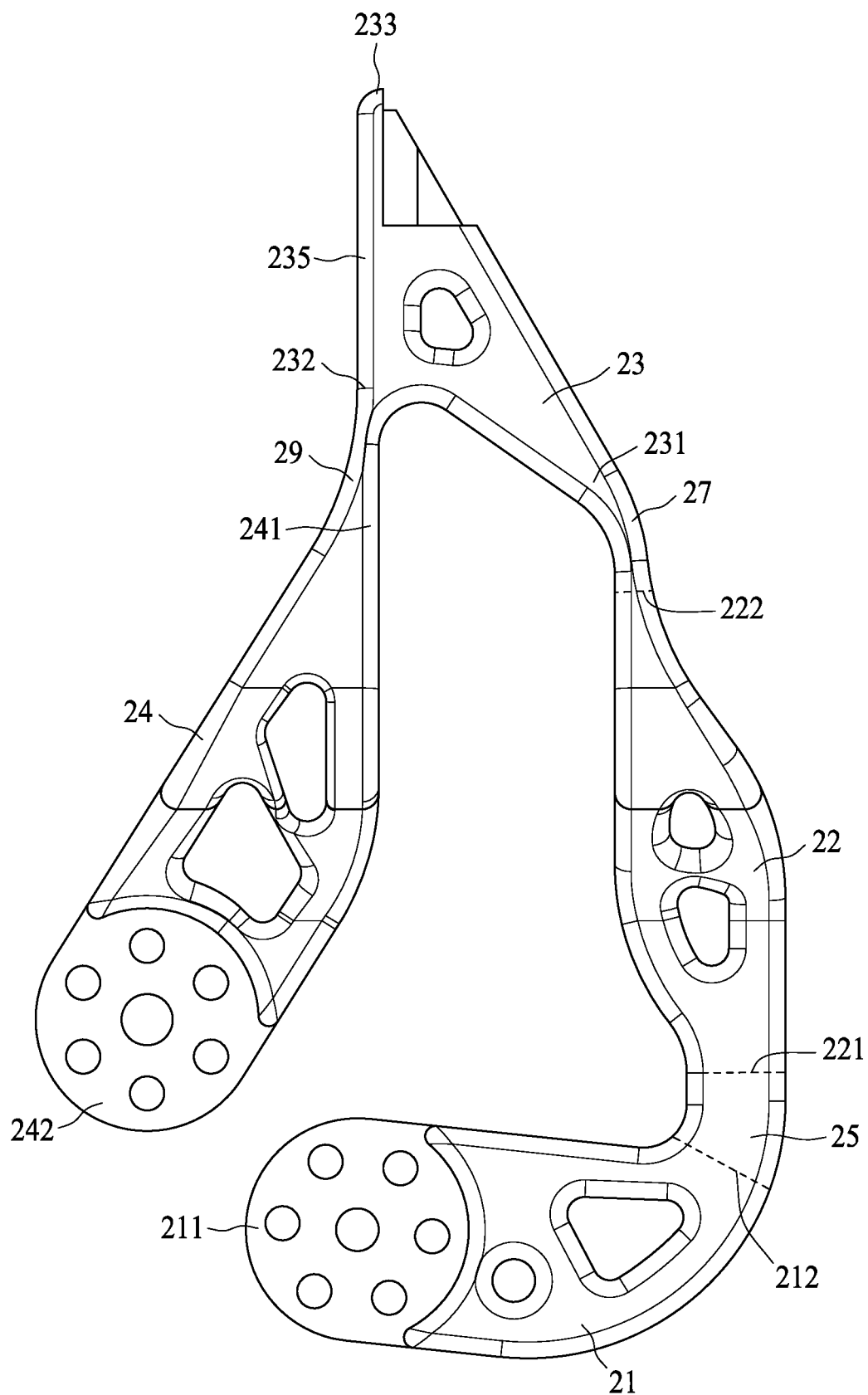
FIG. 3B is a top view of a robotic finger in accordance with some embodiments of the instant disclosure.

FIG. 3B is a top view of a robotic finger 2 in accordance with some embodiments of the instant disclosure. With reference to FIG. 3B, the thickness of the end 212 of the link 21 and the thickness of the end 221 of the link 22 may be greater than the smallest thickness of the joint 25. The thickness of the end 222 of the link 22, and the thickness of the end 231 of the link 23, may be greater than the smallest thickness of the joint 27. The thickness of the end 232 of the link 23 and the thickness of the end 241 of the link 24 are greater than the smallest thickness of the joint 29. That is, the thickness of the link 21, 22, 23 or 24 may be greater than the thickness of the joint 25, 27 or 29 to which it connects. In one embodiment, the smallest thickness of the joint 27 or joint 29 may be around 2.5 mm. In particular, the largest thickness of the link 22 may be about 9 times greater than or equal to the smallest thickness of the joint 27, and the largest thickness of the link 24 may be about 9 times greater than or equal to the smallest thickness of the joint 29. In one embodiment, the largest thickness of the link 22 and the largest thickness of the link 24 may be greater than or equal to 22.5 mm. Further, since the smaller thickness of joint 25, 27, 29 may be substantially smaller than the thickness of the link, 21, 22, 23, 24, the joint 25, 27, 29 will be more flexible and deformable than the links 21, 22, 23 and 24 Referring to FIG. 3B, the joint 25 will act as a joint connecting the links 21 and 22, the joint 27 will act as a joint connecting the links 22 and 23, and the joint 29 will act as a joint connecting the links 23 and 24.

The joints 25, 27 and 29 can be considered as joints with rotation around out-of-plane axes as having a low spring rate, and rotation about in-plane axes as having a high spring rate. Further, the links 21, 22, 23 and 24 while more rigid (not entirely rigid) also may rotate/bend in three axes with various spring rates that are generally higher than the join spring rates. This is a novel aspect of these gripper fingers that allow multiple modes of conformance with a grasped object.

Since the joints 25, 27 and 29 may include elastic material, the spring stiffness of the joints 25, 27 and 29 could be designed by selecting the thicknesses of the joints 25, 27 and 29. As shown in FIG. 3B, the smallest thickness of the joint 25 may be greater than the smallest thickness of the joint 27, and greater than the smallest thickness of the joint 29. That is, the spring stiffness of the joint 25 may be greater than the spring stiffness of the joint 27 and the spring stiffness of the joint 29. In addition, the smallest thickness of the joint 25 may range from two times the smallest thickness of the joint 27 to five times the smallest thickness of the joint 27, or may range from two times the smallest thickness of the joint 29 to five times the smallest thickness of the third joint 29. In one embodiment, the smallest thickness of the joint 25 may range from 5 mm to 12.5 mm.

Referring to FIGS. 3A and 3B, each of the links 23 may have a side surface 235 between the ends 232 and 233, and the side surface 235 is substantially flat. The side surfaces 235 and the links 23 thereof and the joints 29 and 27 which connect to the links 23 can deform independently of the links 22 and 24. That is, the surfaces 235 of the links 23 can accommodate to the irregular surface of the object which will be grasped.

In addition, in some embodiments, the surfaces 235 may not be made the same shape, nor have the same surface material. Further, the surfaces 235 may have different geometries, widths, lengths, stiffnesses to allow a wider range of grasping modes. They may even have different numbers of links and joints.

Figure 3C:
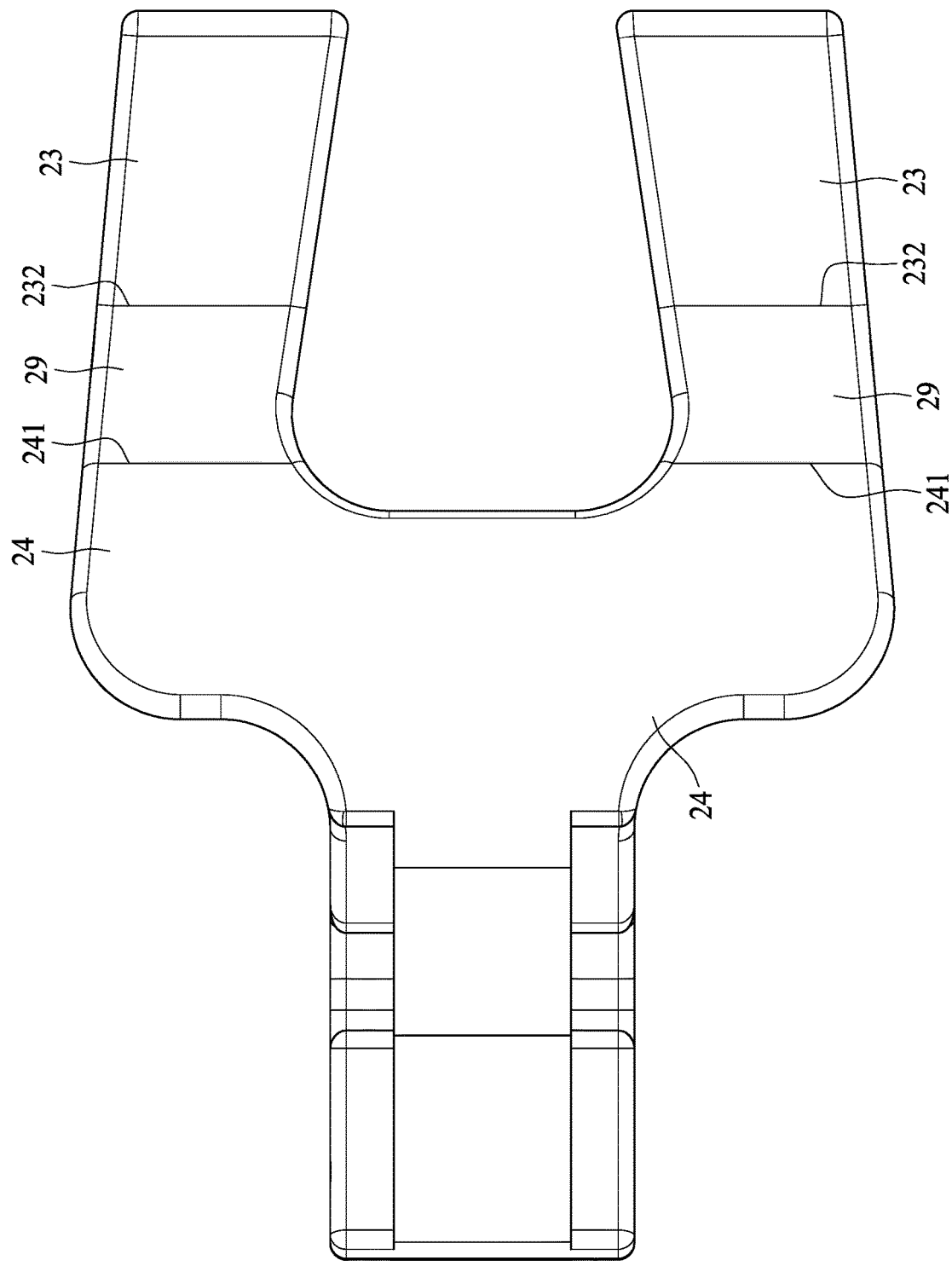
FIG. 3C is a left side view of a robotic finger in accordance with some embodiments of the instant disclosure.
Figure 3D:
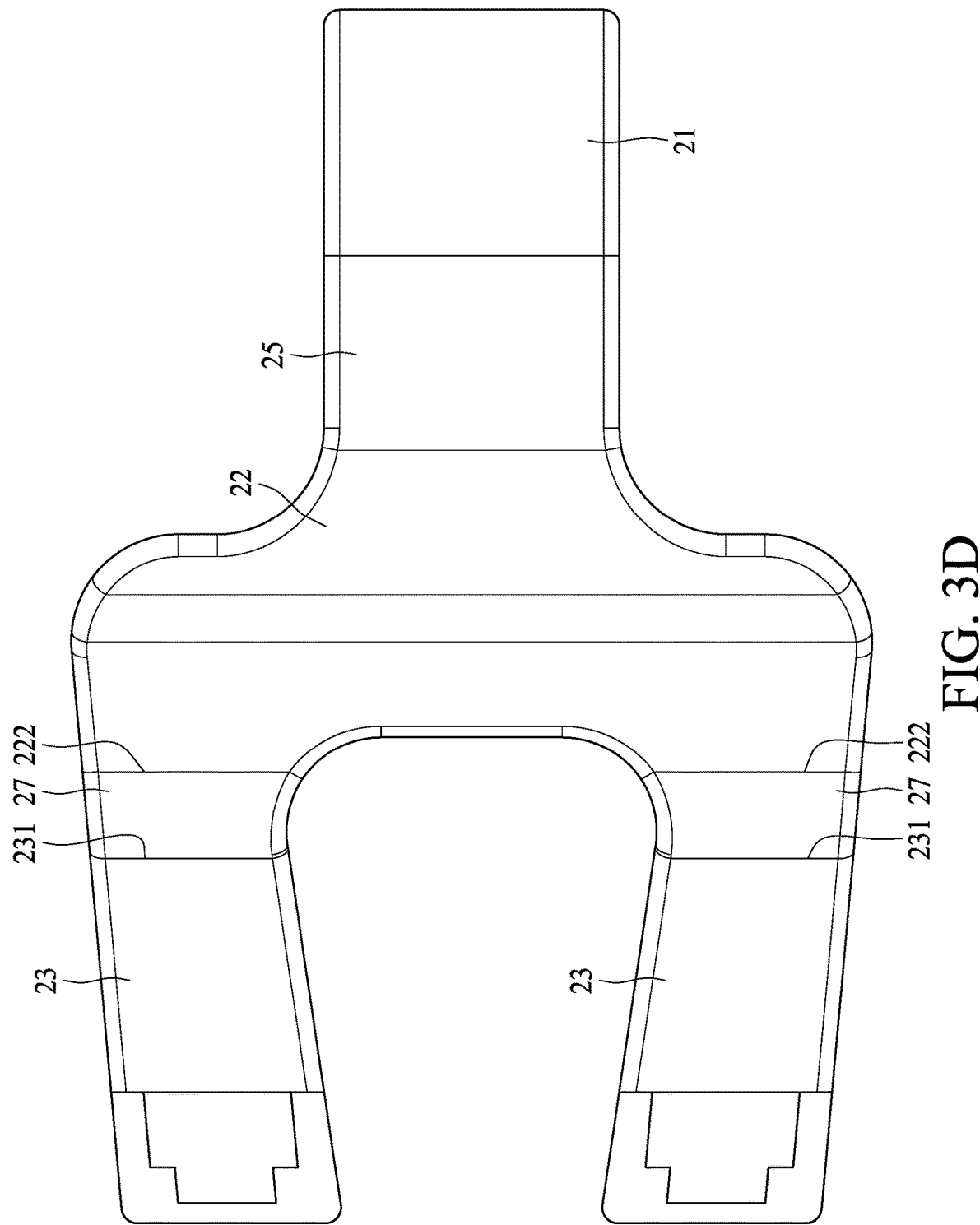
FIG. 3D is a right side view of a robotic finger in accordance with some embodiments of the instant disclosure.

FIGS. 3C and 3D are a left side view and a right side view of a robotic finger 2 in accordance with some embodiments of the instant disclosure. As shown in FIG. 3C, the link 24 may have two ends 241 projecting in a branch-shape and connecting to the joints 29 respectively. Moreover, each of joints 29 may connect the end 232 of the link 23. As shown on FIG. 3D, the link 22 may have two ends 222 projecting in a branch-shape and connecting to the joints 27 respectively. Moreover, each of the joints 27 may connect the end 231 of the link 23. Referring to FIGS. 3C and 3D, the distance between the joints 29, the distances between the joints 27, and the distances between the links 23 are narrowed from the links 22, 24 to the tips of the links 23.

The total length of the finger 2, such as the distance from the right side of the link 21 to the left side of the link 23 as shown in FIG. 3D, may range from thirty times the smallest thickness of the joint 27 to fifty times the smallest thickness of the joint 27, or range from thirty times the smallest thickness of the joint 29 to fifty times the smallest thickness of the third joint 29. In one embodiment, the total length of the robotic finger 2 may range from 75 mm to 125 mm.

In addition, the length of the joint 27 may range from three times the smallest thickness of the joint 27 to six times the smallest thickness of the joint 27, and the length of the joint 29 may range from three times the smallest thickness of the joint 29 to six times the smallest thickness of the joint 29. In one embodiment, the length of the joint 27 and the length of the joint 29 may range from 7.5 mm to 15 mm.

[Exemplary Flexural Stiffness Corrections]

In order to analytically study the subject finger, it is reduced to an approximation of a 5-bar pin-link mechanism. The three joints areas of the finger are approximated as pins with associated spring stiffnesses. The four link areas of the finger are approximated as rigid links, as is the ground link.

Birglen and Gosselin in their paper 'Kinetostatic Analysis of Underactuated Fingers' (2004) propose a method for designing and analyzing the stability of a 5-bar linkage-driven finger similar to our finger. The paper concludes that a pinch grasp is stable if a linear contact is made on both sides of what it also defines as the 'equilibrium point,' which we will not elaborate on here.

However, the analysis only holds if the spring stiffness of the second and third joints is zero. In our case, the spring constants of the second and third joints, while much less than the stiffness of the first joint, are non-negligible. Therefore, the motion of the finger should be corrected so that the gripping area of the third link remains substantially parallel to the Y-Z plane.

The aforesaid correction can be done by, for example but is not limited to, 'superimposing' a linkage with the desired motion onto our original linkage. Without any modification, the third link will rotate too much with respect to the world frame, or, in other words, not rotate enough with respect to the rest of the finger. With the modifications we describe below, the third link will rotate the appropriate amount to keep its face parallel to the opposite gripper finger.

Because the spring strength of the first joint is much greater than those of the second and third joints, we can approximate the linkage as a 4-bar linkage when it is not contacting any object. Instead of designing a parallel linkage, a linkage is designed where the coupler (the third link, in the case of our finger) rotates clockwise whenever the driver (the first link, in the case of our finger) rotates counterclockwise.

Practically, implementing this modification is as simple as making sure the distance from the end 111 of the link 11 to the end 142 of the fourth link 14 is greater than the distance from the joint 17 to the joint 19.

Figure 4A:
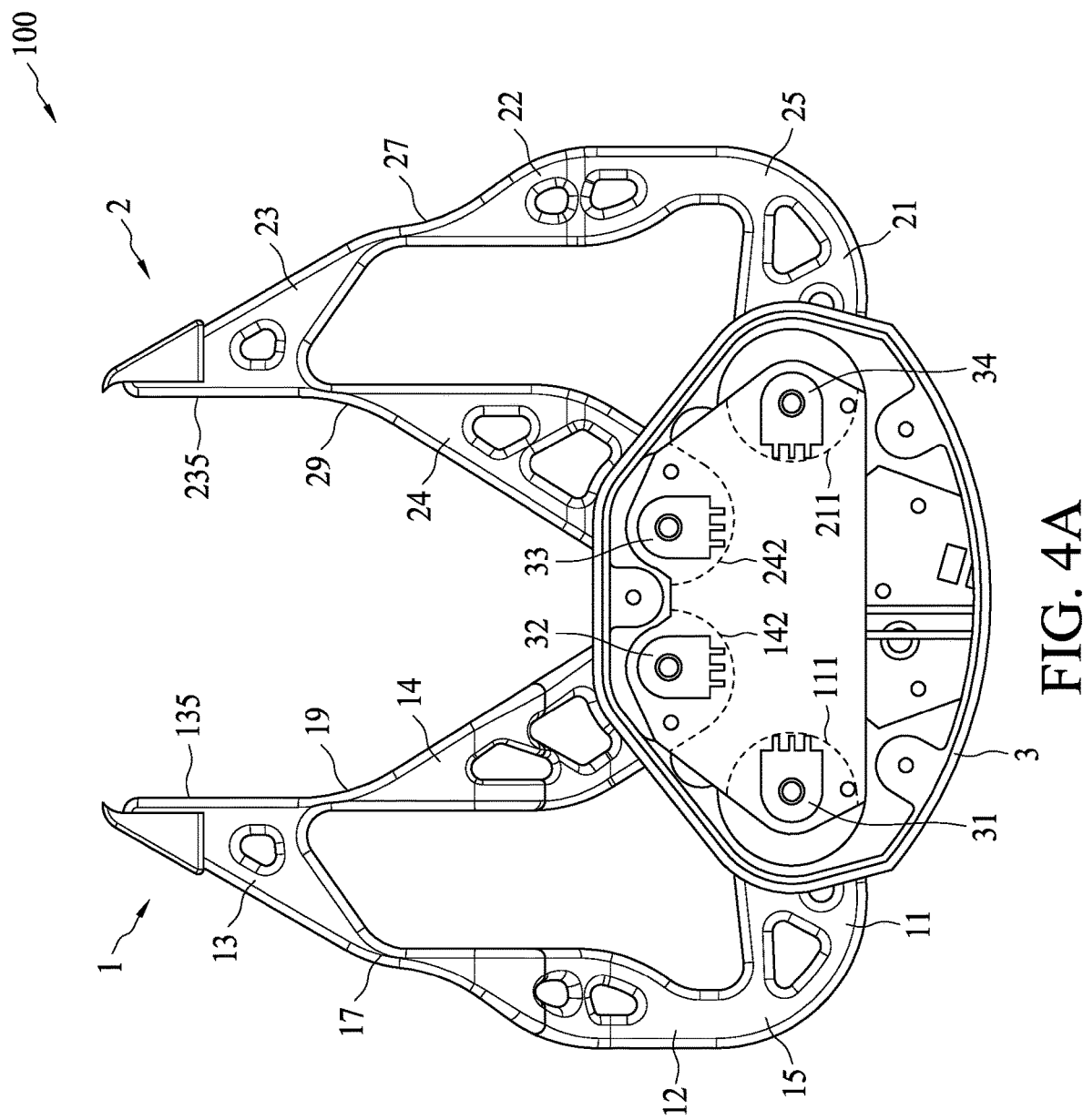
FIG. 4A is a top schematic view of a robotic gripper in accordance with some embodiments of the instant disclosure.

FIG. 4A is a top schematic view of a robotic gripper 100 in accordance with some embodiments of the instant disclosure. As shown in FIG. 4A, the robotic gripper 100 may have a body 3 and two robotic fingers 1 and 2 mounted to the body 3. The body may have two drivers and two idle ground joints, wherein one of the elements 31 and 32 is a driver and the other one is an idle ground joint, and wherein one of the elements 33 and 34 is a driver and the other one is an idle ground joint. The end 111 of the link 11 of the robotic finger 1 is mounted to the element 31 (not shown), and the end 142 of the link 14 of the robotic finger 1 is mounted to the element 32, and thereby the robotic finger 1 is mounted to the body 3. It means that the robotic finger 1 will be driven by a single driver. When the driver drives the end 111 to rotate around the element 31 or drives the end 142 to rotate around the element 32, the robotic finger 1 will move relative to the body 3. Moreover, the end 242 of the link 24 of the robotic finger 2 is mounted to the element 33, and the end 211 of the link 21 of the robotic finger 2 is mounted to the element 34, and thereby the robotic finger 2 is mounted to the body 3. It means that the robotic finger 2 will be driven by a single driver. When the driver drives the end 242 to rotate around the element 33 or drives the end 211 to rotate around the element 34, the robotic finger 2 will move relative to the body 3. In addition, referring to FIG. 4A, the position of the element 31 is lower than the position of the element 32, and the position of the element 34 is lower than the position of the element 33 such that the line between the elements 31 and 32, and the line between the joints 17 and 19 are not parallel to each other, and the line between the elements 33 and 34 and the line between the joints 27 and 29 are not parallel to each other. Further, the distance between the elements 31 and 32 is larger than the distance between the joints 17 and 19 of the robotic finger 1, and the distance between the elements 33 and 34 is larger than the distance between the joints 27 and 29 of the robotic finger 2. Moreover, the face 135 of robotic finger 1 and the line between joints 17 and 19 of robotic finger 1 form an angle that is greater than 90 degrees. Further, the surface 135 of the robotic finger 1 and the surface 235 of the robotic finger 2 are substantially parallel to each other.

Figure 4B:
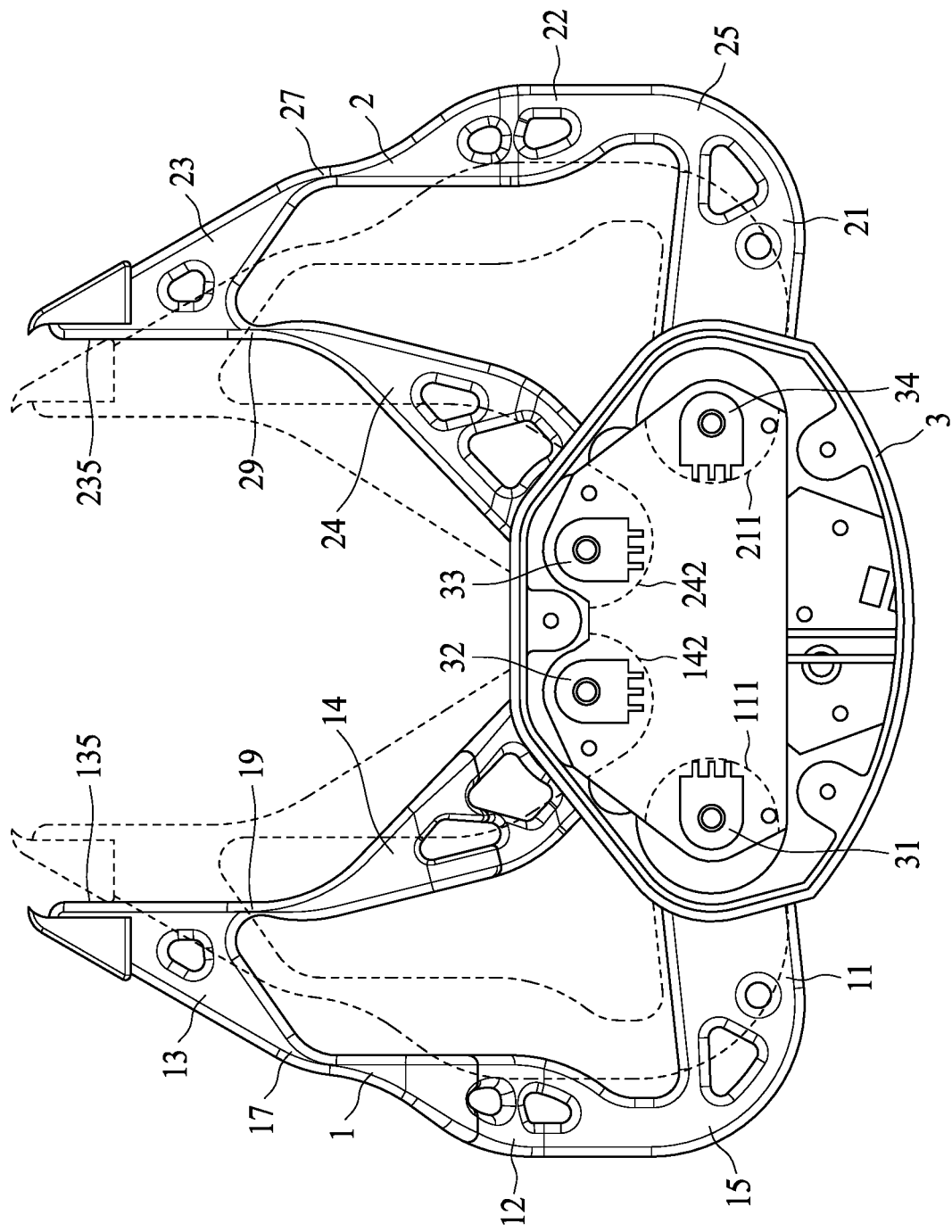
FIG. 4B is a top schematic view of a robotic gripper in accordance with some embodiments of the instant disclosure, wherein the robotic fingers are opened.

FIG. 4B is a top schematic view of a robotic gripper 100 in accordance with some embodiments of the instant disclosure, wherein the robotic fingers 1 and 2 are opened. As shown in FIG. 4B, the robotic fingers 1 and 2 are actuated to move away from each other. The robotic finger 1 is driven by one of the elements 31 and 32. Since the robotic finger 1 includes elastic material and is formed in one piece and has the flexible and deformable joints 15, 17, and 19, the robotic finger 1 will act as a five-bar linkage mechanism when the driver drives the robotic finger 1. Referring to FIG. 4B, when the robotic finger 1 is moved outwardly by the driver, the joints 15, 17, and 19 are deformed, and the links 11, 12 and 13 are rotated around the joints 15, 17, and 19. Likewise, the robotic finger 2 is driven by one of the elements 33 and 34. Since the robotic finger 2 includes elastic material and is formed in one piece and has the flexible and deformable joints 25, 27, and 29, the robotic finger 2 will act as a five-bar linkage mechanism when the driver drives the robotic finger 2. Referring to FIG. 4B, when the robotic finger 2 is moved outwardly by the driver, the joints 25, 27 and 29 are deformed, and the links 21, 22 and 23 are rotated around the joints 25, 27 and 29.

In addition, since the line between the elements 31 and 32 and the line between the joints 17 and 19 are not parallel to each other, and the line between the elements 33 and 34 and the line between the joints 27 and 29 are not parallel to each other, and the distance between the elements 31 and 32 is substantially larger than the distance between the joints 17 and 19 of the robotic finger 1 and the distance between the elements 33 and 34 is substantially larger than the distance between the joints 27 and 29 of the robotic finger 2, the side surface 135 of the robotic finger 1 and the side surface 235 of the robotic finger 2 will be kept to be substantially parallel to each other during the process of opening the robotic fingers 1 and 2.

Figure 4C:
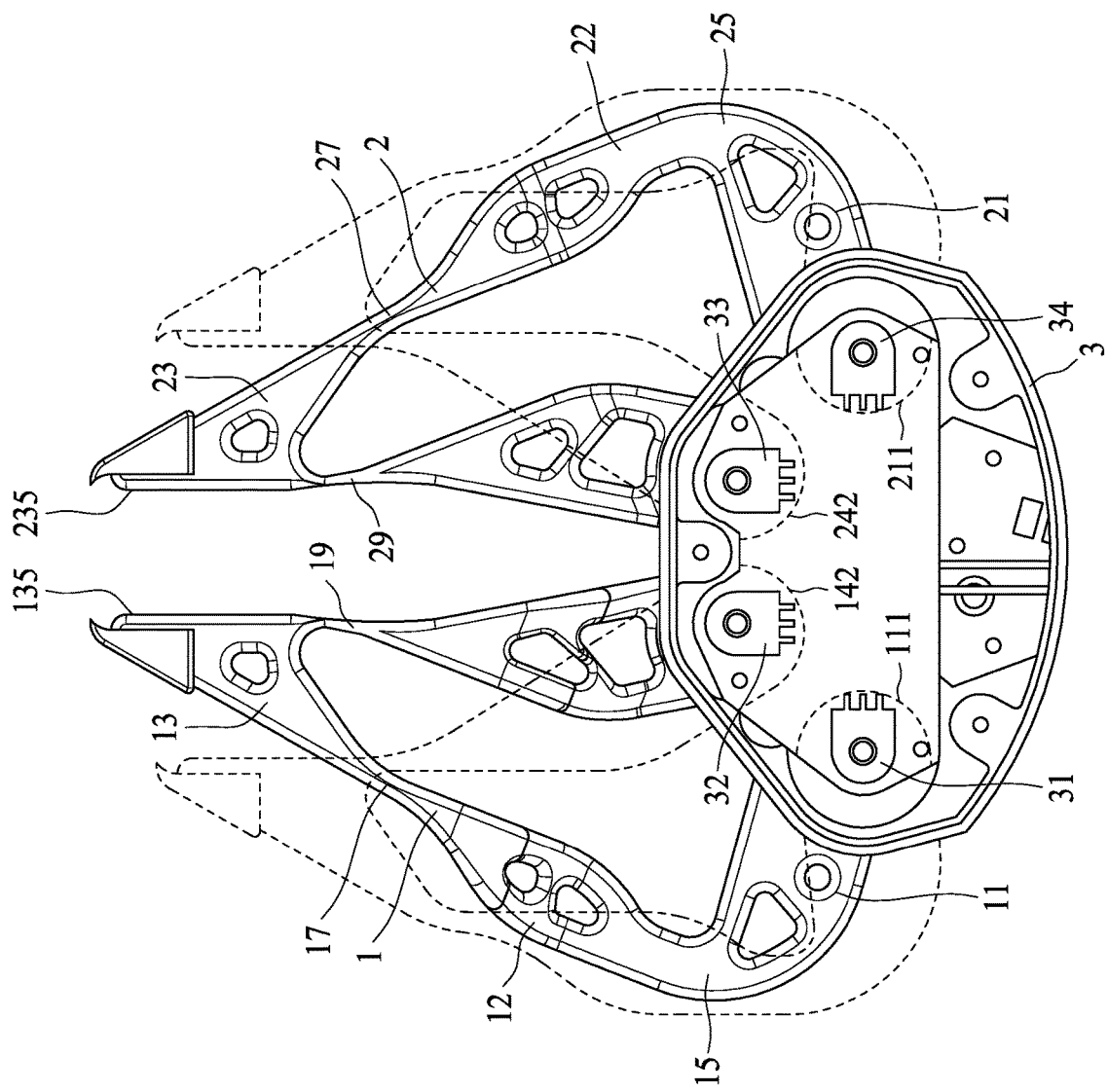
FIG. 4C is a top schematic view of a robotic gripper in accordance with some embodiments of the instant disclosure, wherein the robotic fingers are nearly closed.

FIG. 4C is a top schematic view of a robotic gripper 100 in accordance with some embodiments of the instant disclosure, wherein the robotic fingers 1 and 2 are nearly closed. As shown in FIG. 4C, the robotic fingers 1 and 2 are actuated to move close to each other. As mentioned above, since the robotic finger 1 includes elastic material and is formed in one piece and has the flexible and deformable joints 15, 17 and 19, the robotic finger 1 will act as a five-bar linkage mechanism when the driver drives the robotic finger 1. Referring to FIG. 4C, when the robotic finger 1 is moved inwardly by the driver, the joints 15, 17 and 19 are deformed and the links 11, 12 and 13 are rotated around the joints 15, 17 and 19. Further, since the robotic finger 2 includes elastic material and is formed in one piece and has the flexible and deformable joints 25, 27 and 29, the robotic finger 2 will act as a five-bar linkage mechanism when the driver drives the robotic finger 2. Referring to FIG. 4C, when the robotic finger 2 is moved inwardly by the driver, the joints 25, 27 and 29 are deformed and the links 21, 22 and 23 are rotated around the joints 25, 27 and 29.

In addition, since the line between the elements 31 and 32 and the line between the joints 17 and 19 are not parallel to each other, and the line between the elements 33 and 34 and the line between the joints 27 and 29 are not parallel to each other and the distance between the elements 31 and 32 is substantially larger than the distance between the joints 17 and 19 of the robotic finger 1, and the distance between the elements 33 and 34 is substantially larger than the distance between the joints 27 and 29 of the robotic finger 2, the side surface 135 of the robotic finger 1 and the side surface 235 of the robotic finger 2 will be kept to be substantially parallel to each other during the process of closing the robotic fingers 1 and 2.

Figure 5A:
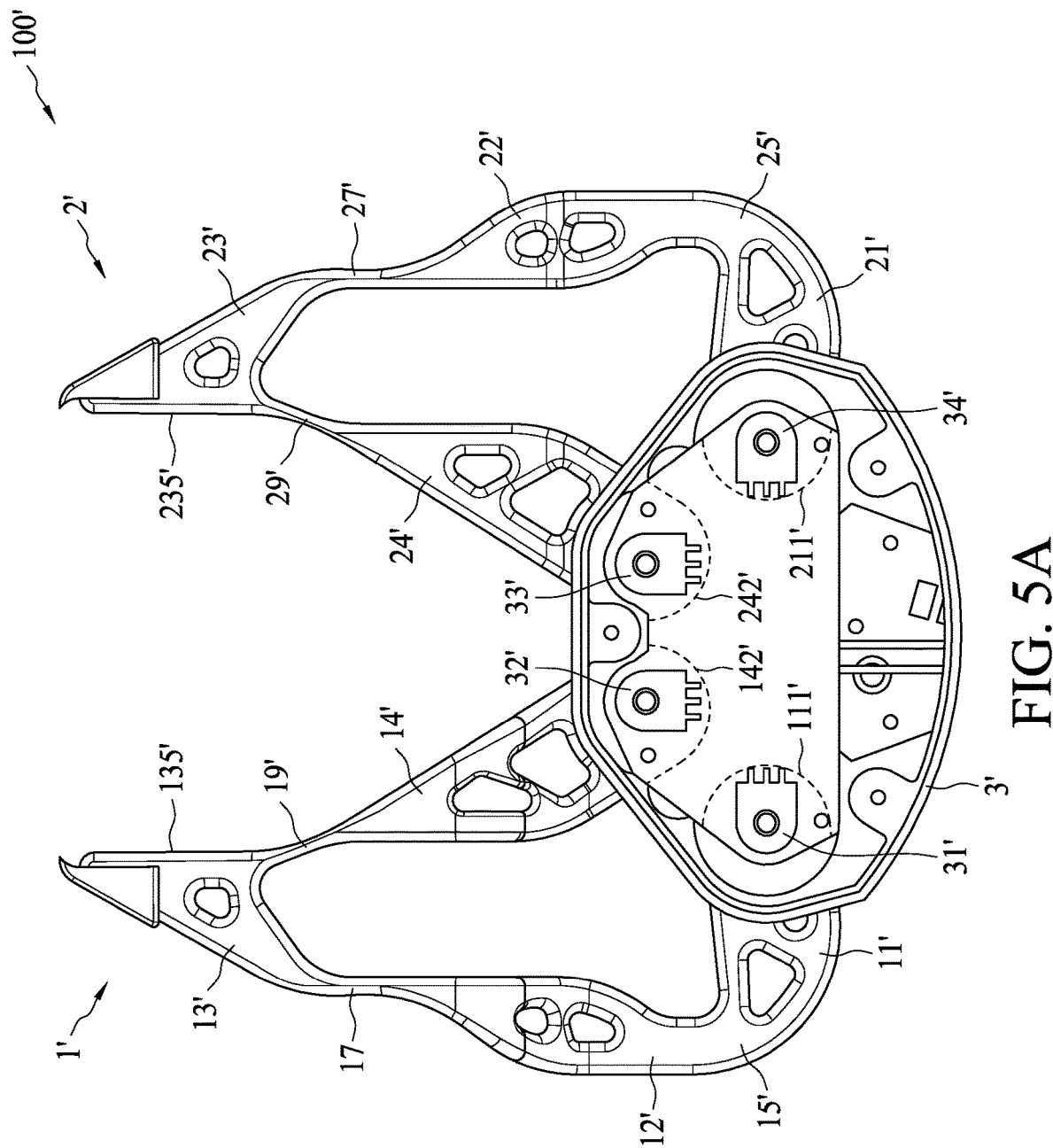
FIG. 5A is a top schematic view of a robotic gripper in accordance with some other embodiments of the instant disclosure.

FIG. 5A is a top schematic view of a robotic gripper 100' in accordance with another embodiment of the instant disclosure. As shown in FIG. 5A, the robotic gripper 100' may have a body 3' and two robotic fingers 1' and 2' mounted to the body 3'. The body 3' may have two drivers and two idle ground joints, wherein one of the elements 31' and 32' is a driver and the other one is an idle ground joint, and wherein one of the elements 33' and 34' is a driver and the other one is an idle ground joint. The end 111' of the link 11' of the robotic finger 1' is mounted to the element 31' and the end 142' of the link 14' of the robotic finger 1' is mounted to the element 32', and thereby the robotic finger 1' is mounted to the body 3'. It means that the robotic finger 1' will be driven by a single driver. When the driver drives the end 111' to rotate around the element 31' or drives the end 142' to rotate around the element 32', the robotic finger 1' will move relative to the body 3'. Moreover, the end 242' of the link 24' of the robotic finger 2' is mounted to the element 33' and the end 211' of the link 21' of the robotic finger 2' is mounted to the element 34', and the robotic finger 2' is thereby mounted to the body 3'. It means that the robotic finger 2' will be driven by a single driver. When the driver drives the end 242' to rotate around the element 33' or drives the end 211' to rotate around the element 34', the robotic finger 2' will move relative to the body 3'. In addition, referring to FIG. 5A, the elements 31', 32', 33' and 34' are positioned such that the line between the elements 31' and 32' and the line between the joints 17' and 19' are parallel to each other, and the line between the elements 33' and 34' and the line between the joints 27' and 29' are parallel to each other. Further, the distance between the elements 31' and 32' is substantially equal to the distance between the joints 17' and 19' of the robotic finger 1', and the distance between the elements 33' and 34' is substantially equal to the distance between the joints 27' and 29' of the robotic finger 2'. Thus, in this state, the surfaces 135' and 235' of the robotic fingers 1 and 2 may not be kept to be substantially parallel to each other. As shown in FIG. 5A, the surfaces 135' and 235' may be inclined outwardly.

Figure 5B:
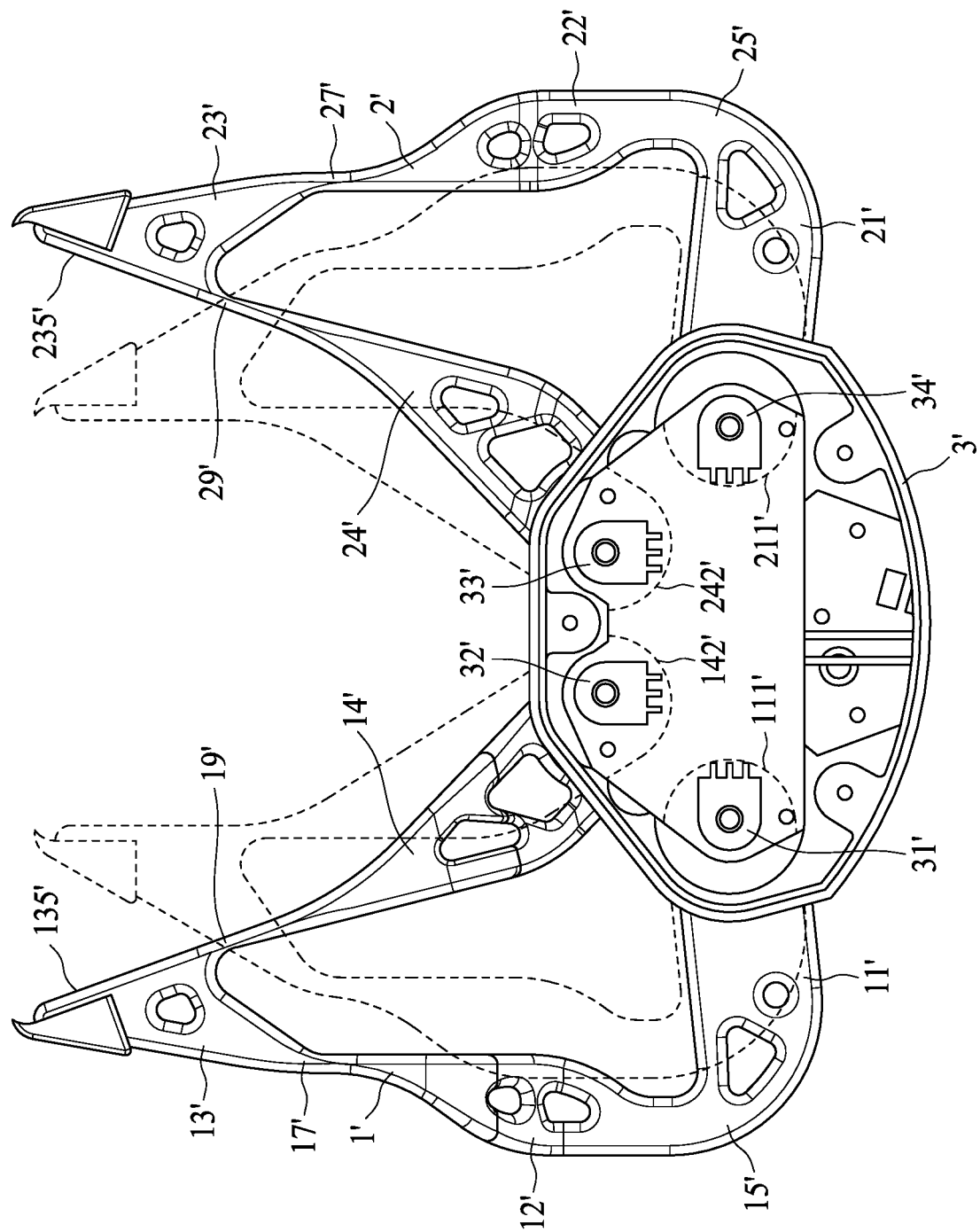
FIG. 5B is a top schematic view of a robotic gripper in accordance with some other embodiments of the instant disclosure, wherein the robotic fingers are opened.

FIG. 5B is a top schematic view of a robotic gripper 100' in accordance with some embodiments of the instant disclosure, wherein the robotic fingers 1' and 2' are opened. As shown in FIG. 5B, the robotic fingers 1' and 2' are actuated to move away from each other. The robotic finger 1' is driven by one of the elements 31' and 32'. Since the robotic finger 1' includes elastic material and is formed in one piece and has the flexible and deformable joints 15', 17' and 19', the robotic finger 1' will act as a five-bar linkage mechanism when the driver drives the robotic finger 1'. Referring to FIG. 5B, when the robotic finger 1' is moved outwardly by the driver, the joints 15', 17' and 19' are deformed and the links 11', 12' and 13' are rotated around the joints 15', 17' and 19'. Likewise, the robotic finger 2' is driven by one of the elements 33' and 34'. Since the robotic finger 2' includes elastic material and is formed in one piece, and has the flexible and deformable joints 25', 27' and 29', the robotic finger 2' will act as a five-bar linkage mechanism when the driver drives the robotic finger 2'. Referring to FIG. 5B, when the robotic finger 2' is moved outwardly by the driver, the joints 25', 27' and 29' are deformed and the links 21', 22' and 23' are rotated around the joints 25', 27' and 29'.

In addition, since the line between the elements 31' and 32' and the line between the joints 17' and 19' are substantially parallel to each other, and the line between the elements 33' and 34' and the line between the joints 27' and 29' are substantially parallel to each other and the distance between the elements 31' and 32' is substantially equal to the distance between the joints 17' and 19' of the robotic finger 1', and the distance between the elements 33' and 34' is substantially equal to the distance between the joints 27' and 29' of the robotic finger 2', the side surface 135' of the robotic finger 1' and the side surface 235' of the robotic finger 2' will not be kept to be substantially parallel to each other during the process of opening the robotic fingers 1' and 2'. As shown in FIG. 5B, the surfaces 135' and 235' are inclined outwardly.

Figure 5C:
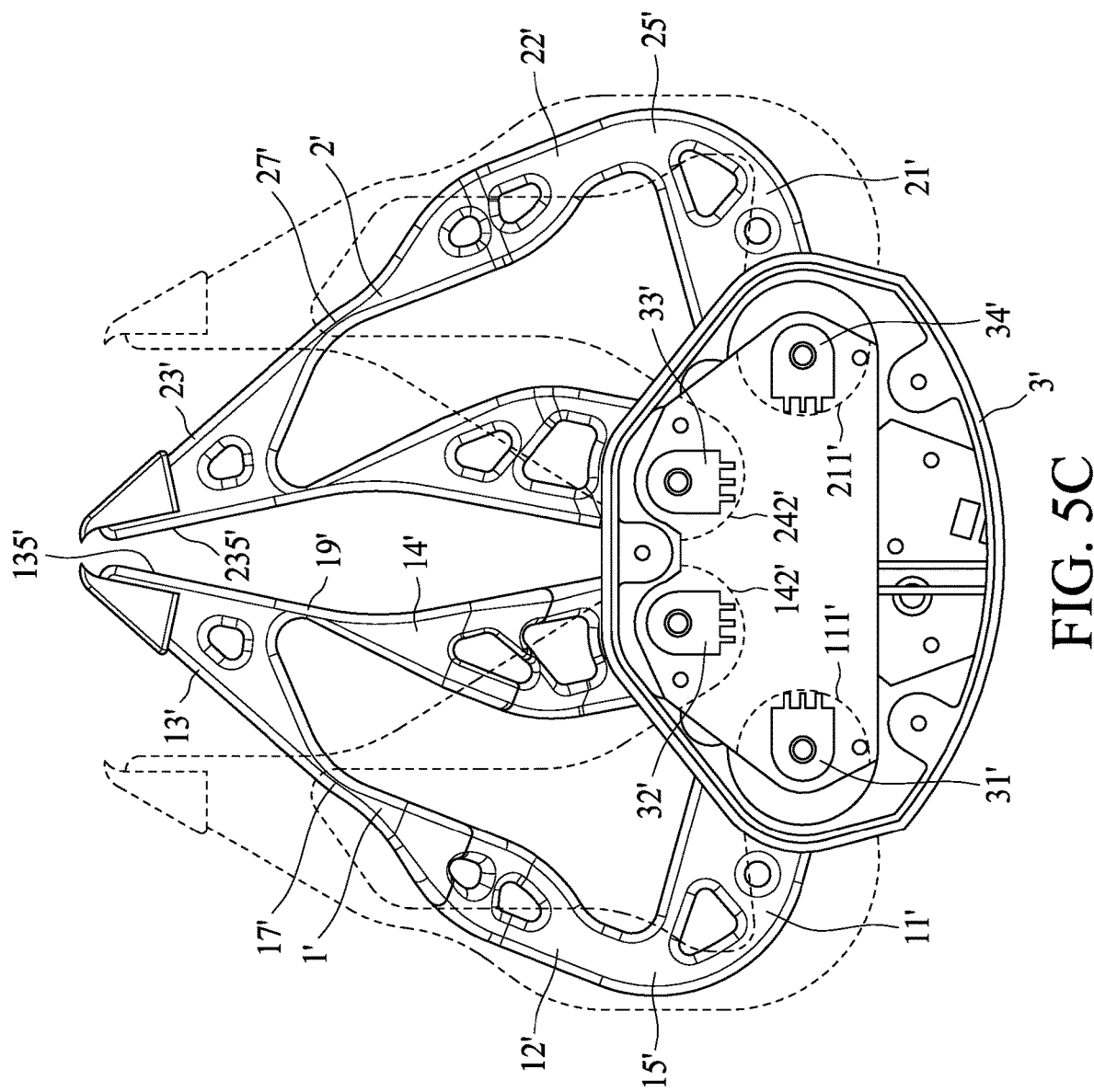
FIG. 5C is a top schematic view of a robotic gripper in accordance with some other embodiments of the instant disclosure, wherein the robotic fingers are nearly closed.

FIG. 5C is a top schematic view of a robotic gripper 100' in accordance with some embodiments of the instant disclosure, wherein the robotic fingers 1' and 2' are in a substantially closed state. As shown in FIG. 5C, the robotic fingers 1' and 2' are actuated to move close to each other. As mentioned above, since the robotic finger 1' includes elastic material and is formed in one piece and has the flexible and deformable joints 15', 17' and 19', the robotic finger 1' will act as a five-bar linkage mechanism when the driver drives the robotic finger 1'. Referring to FIG. 5C, when the robotic finger 1' is moved inwardly by the driver, the joints 15', 17' and 19' are deformed and the links 11', 12' and 13' are rotated around the joints 15', 17' and 19'. Further, since the robotic finger 2' includes elastic material and is formed in one piece and has the flexible and deformable joints 25', 27' and 29', the robotic finger 2' will act as a five-bar linkage mechanism when the driver drives the robotic finger 2'. Referring to FIG. 5C, when the robotic finger 2' is moved inwardly by the driver, the joints 25', 27' and 29' are deformed and the links 21', 22' and 23' are rotated around the joints 25', 27' and 29'.

In addition, since the line between the elements 31' and 32' and the line between the joints 17' and 19' are substantially parallel to each other, and the line between the elements 33' and 34' and the line between the joints 27' and 29' are substantially parallel to each other, and the distance between the elements 31' and 32' is substantially equal to the distance between the joints 17' and 19' of the robotic finger 1', and the distance between the elements 33' and 34' is substantially equal to the distance between the joints 27' and 29' of the robotic finger 2' (referring to FIG. 5A), the side surface 135' of the robotic finger 1' and the side surface 235' of the robotic finger 2' will not be kept to be substantially parallel to each other during the process of closing the robotic fingers 1' and 2'. As shown in FIG. 5C, the side surfaces 135' and 235' are inclined inwardly.

Given the above, as shown in FIG. 5A, if the line between the elements 31' and 32' and the line between the joints 17' and 19' are substantially parallel to each other, and the line between the elements 33' and 34' and the line between the joints 27' and 29' are substantially parallel to each other, and the distance between the elements 31' and 32' is substantially equal to the distance between the joints 17' and 19' of the robotic finger 1' and the distance between the elements 33' and 34' is substantially equal to the distance between the joints 27' and 29' of the robotic finger 2', the side surface 135' of the robotic finger 1' and the side surface 235' of the robotic finger 2' will not be kept to be substantially parallel to each other during the processes of opening and closing the robotic fingers 1' and 2'. As shown in FIGS. 5B and 5C, the surfaces 135' and 235' are inclined outwardly when the robotic fingers 1' and 2' are opened and the side surfaces 135' and 235' are inclined inwardly when the robotic fingers 1' and 2' are closed. Since the side surface 135' of the robotic finger 1' and the side surface 235' of the robotic finger 2' will not be kept to be substantially parallel to each other during the processes of opening and closing the robotic fingers 1' and 2', the robotic gripper 100' cannot accurately and smoothly pinch an object. Especially, the robotic gripper 100' will hardly pinch a small object or an object with a small diameter, such as a pen.

[An Exemplary Embodiment of Pinch Mode]

Figure 6A:
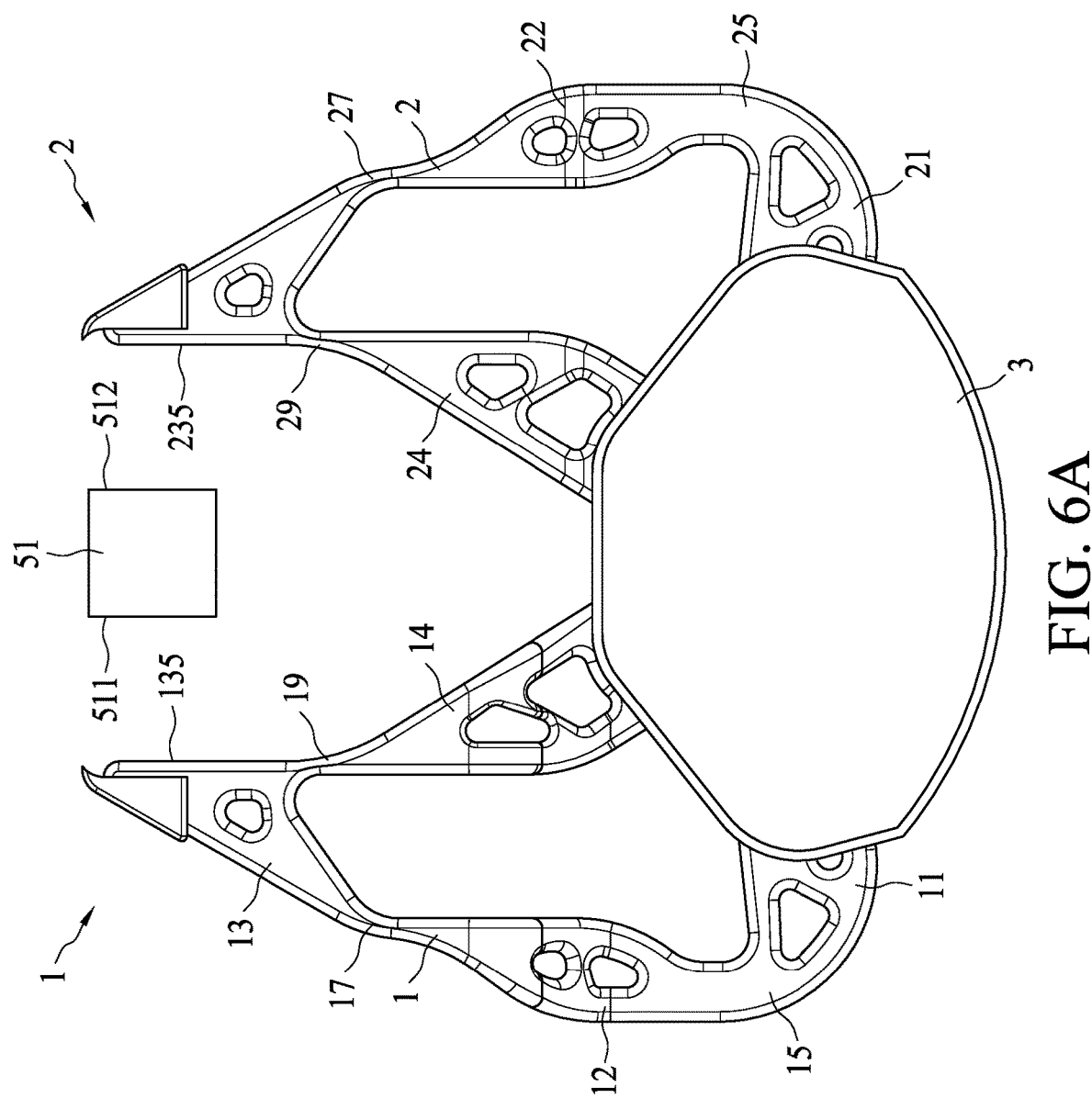
FIGS. 6A and 6B show a robotic gripper in accordance with some embodiments of the instant disclosure, wherein the robotic gripper pinches a square object.
Figure 6B:
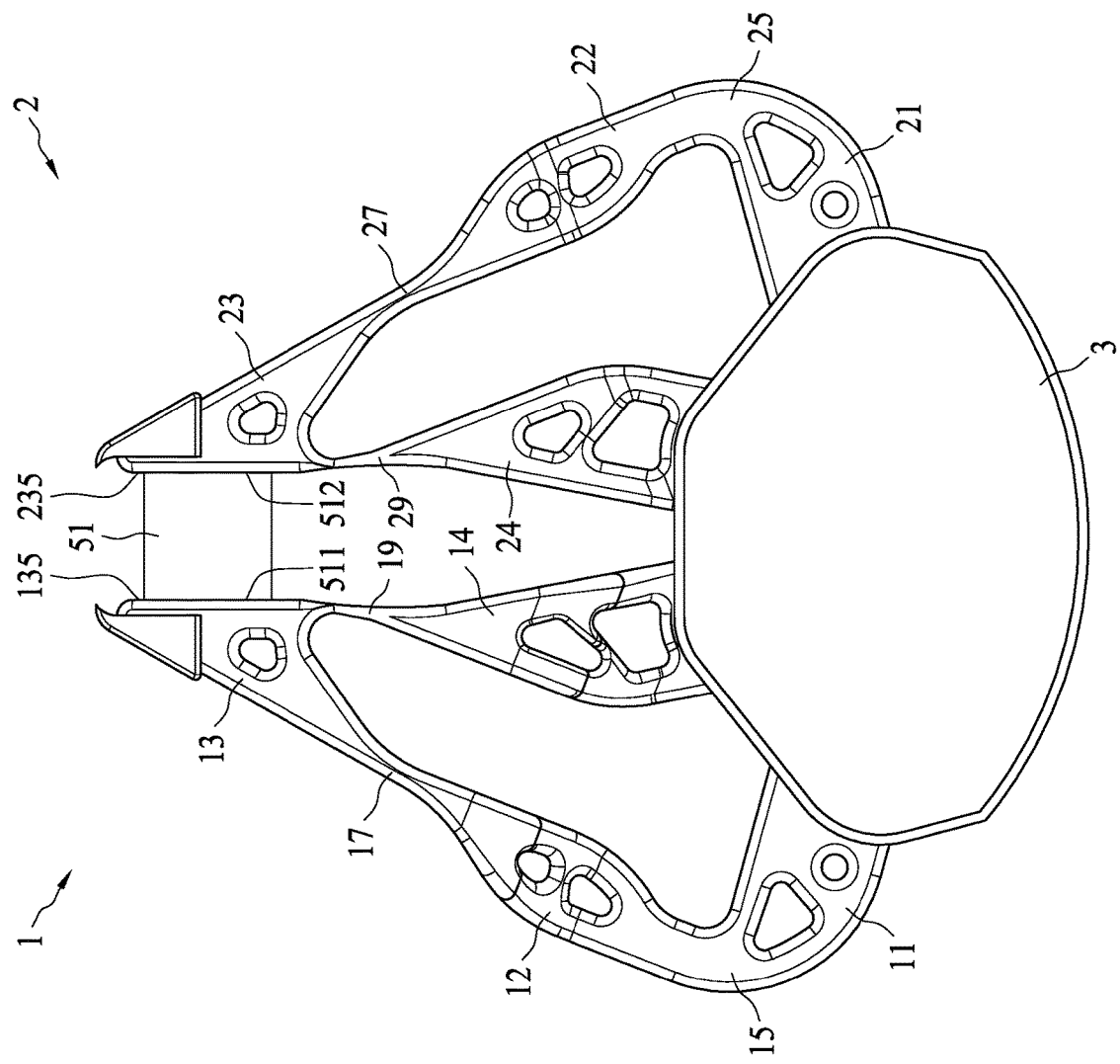

FIGS. 6A and 6B show that the robotic gripper 100 can perform a pinch grasp of a square object. Referring to FIG. 6A, the robotic gripper 100 will pinch an object 51 which has two substantially flat and substantially parallel surfaces 511 and 512. The drivers 31, 32, 33 and 34 drive the robotic fingers 1 and 2 such that they move inwardly. As mentioned above, the side surface 135 of the robotic finger 1 and the side surface 235 of the robotic finger 2 will be kept to be substantially parallel to each other during the process of closing the robotic fingers 1 and 2. Thus, the side surface 135 and the side surface 235 will be substantially parallel to each other until they contact the side surfaces 511 and 512 of the object 51. As shown in FIG. 6B, since the side surfaces 511 and 512 of the object 51 are parallel to each other, the parallel surfaces 135 and 235 can directly pinch the object 51. Then the robotic fingers 1 and 2 have grasped and can lift the object 51.

As mentioned above, the spring stiffness of the joint 15 is substantially greater than the spring stiffness of the joint 17 and the spring stiffness of the joint 19, and the spring stiffness of the joint 25 is substantially greater than the spring stiffness of the joint 27 and the spring stiffness of the joint 29. The greater spring stiffness of the joints 15 and 25 will be helpful for keeping the side surfaces 135 and 235 to be substantially parallel to each other during the process of closing the robotic fingers 1 and 2, and cause the robotic fingers 1 and 2 to be strong enough to pinch the object 51 tightly. If the spring stiffness of the joints 15 and 25 are too weak, the side surfaces 135 and 235 may not remain substantially parallel to each other during the process of closing the robotic fingers 1 and 2, and then the robotic fingers 1 and 2 cannot pinch the object 51. Even if such robotic fingers 1 and 2 with weak spring stiffness of the joints 15 and 25 can pinch the object 51, the robotic fingers 1 and 2 will not be strong enough to pinch the object 51 tightly. Thus, preferably, the smallest thickness of the joint 15 is at least two times greater than the smallest thickness of the joint 17 and at least two times greater than the smallest thickness of the joint 19, and the smallest thickness of the joint 25 is at least two times greater than the smallest thickness of the joint 27 and at least two times greater than the smallest thickness of the joint 29.

[An Exemplary Embodiment of Conforming Mode]

Figure 7A:
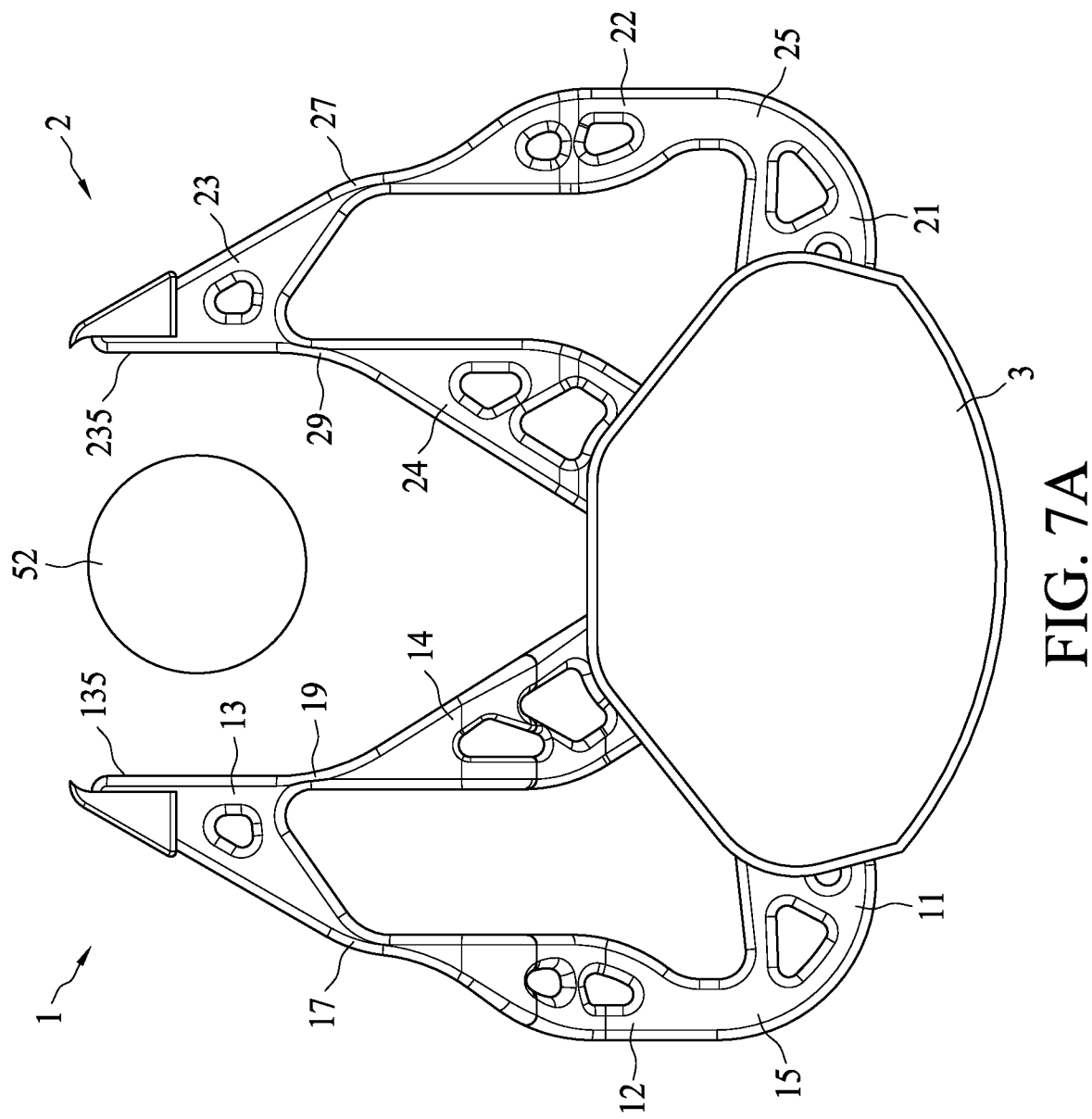
FIGS. 7A, 7B and 7C show a robotic gripper in accordance with some embodiments of the instant disclosure, wherein the robotic gripper grasps an oddly-shaped object.
Figure 7B:
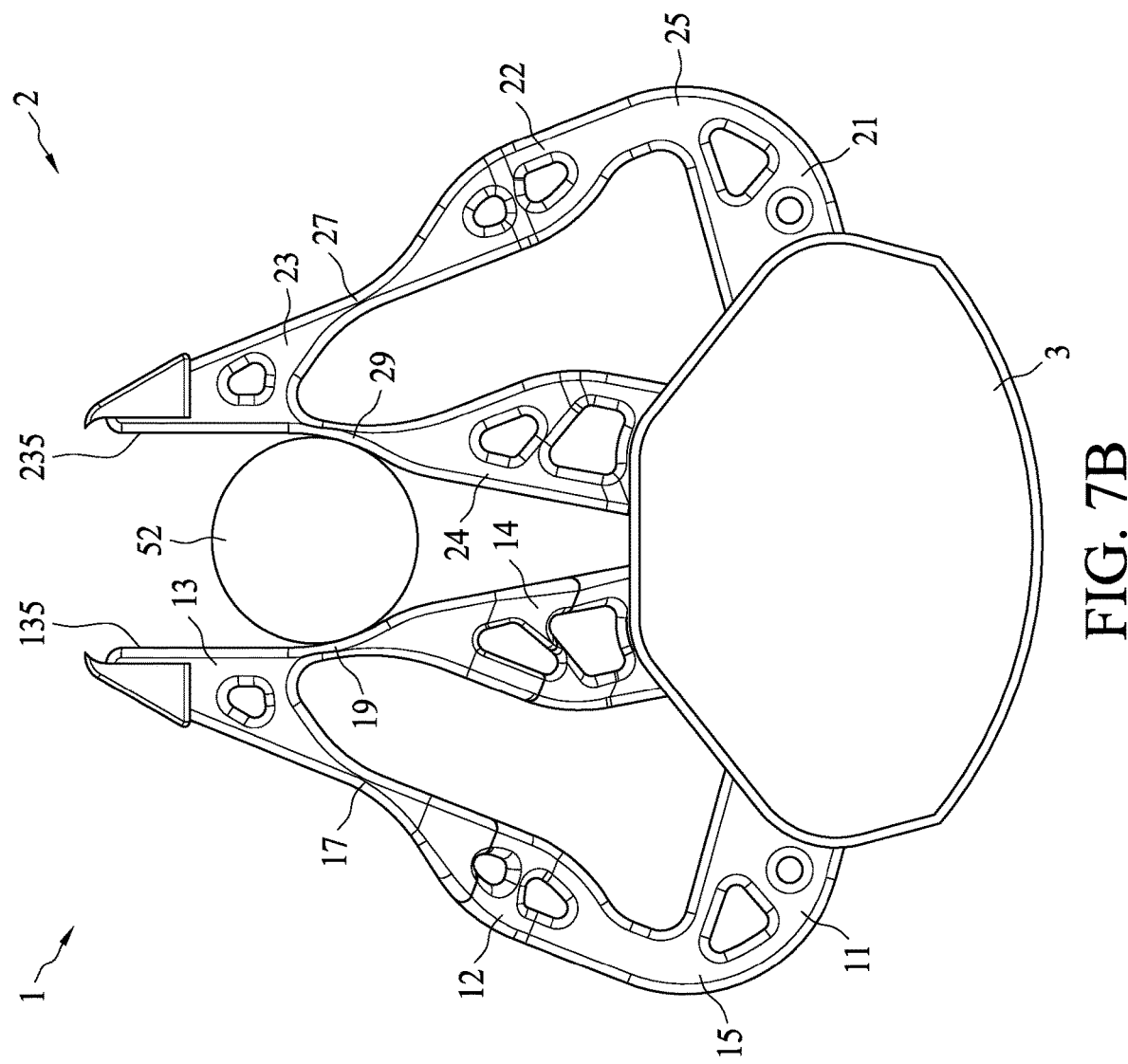
Figure 7C:
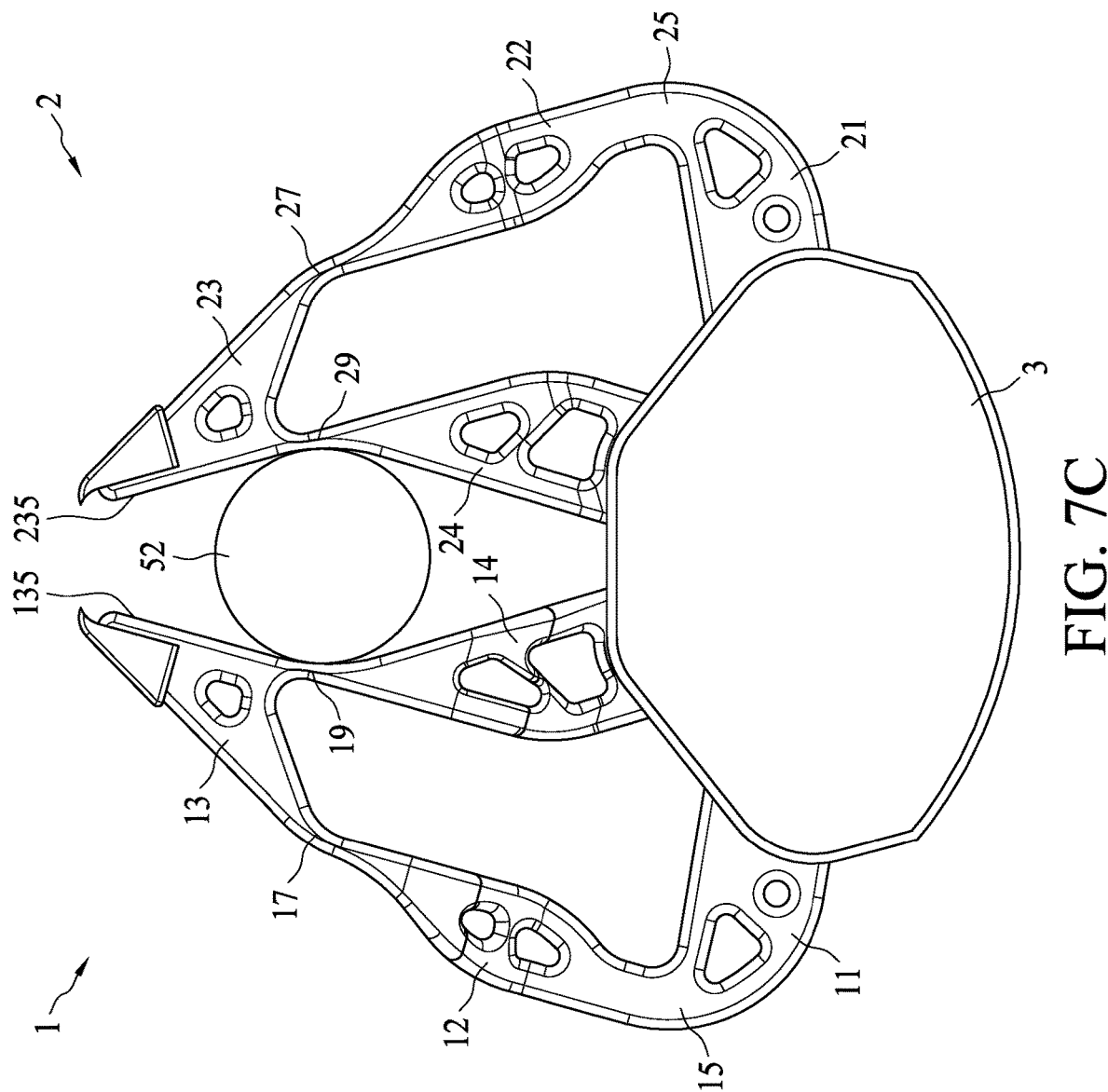

FIGS. 7A, 7B and 7C show that the robotic gripper 100 grasps an oddly-shaped object. Referring to FIG. 7A, the robotic gripper 100 will grasp an oddly-shaped object, such as a ball 52. The drivers 31, 32, 33 and 34 drive the robotic fingers 1 and 2 such that they move inwardly. As mentioned above, the side surface 135 of the robotic finger 1 and the side surface 235 of the robotic finger 2 will be kept to be substantially parallel to each other during the process of closing the robotic fingers 1 and 2. Thus, the side surface 135 and the side surface 235 will be substantially parallel to each other until the robotic fingers 1 and 2 contact the outer surface of the ball 52. As shown in FIG. 7B, the robotic fingers 1 and 2 contact the outer surface of the ball 52 and the side surfaces 135 and 235 are substantially parallel to each other.

After the robotic fingers 1 and 2 contact the outer surface of the ball 52, the drivers 31, 32, 33 and 34 still drive the robotic fingers 1 and 2 to move inwardly. However, since the ball 52 is grasped between the link 14 of the robotic finger 1 and the link 24 of the robotic finger 2, the links 14 and 24 will not continue to move inwardly. Thus, the drivers 31, 32, 33 and 34 will cause the joints 15, 17, 19, 25, 27 and 29 to be further deformed. In this way, as shown in FIG. 7C, the links 13 and 23 will further rotate around the joints 19 and 29 respectively and thus still move inwardly. Finally, the robotic fingers 1 and 2 will conform to the ball 52, and then the robotic gripper can grasp and lift the ball 52.

In addition, as mentioned above, the spring stiffness of the joints 15, 25 should be strong enough such that the robotic fingers 1 and 2 are tough enough to pinch an object tightly. However, if the spring stiffness of the joints 15, 25 is too strong, the joints 15 and 25 will not be further deformed after the robotic fingers 1 and 2 contact the ball 52 and the drivers 31, 32, 33 and 34 still drive the robotic fingers 1 and 2 to move inwardly. That is, the links 13 and 23 will not further rotate around the joints 19 and 29 respectively and will not move inwardly. Therefore, the robotic fingers 1 and 2 will ultimately not conform to the ball 52.

[Another Exemplary Embodiment of Conforming Mode]

Figure 8A:
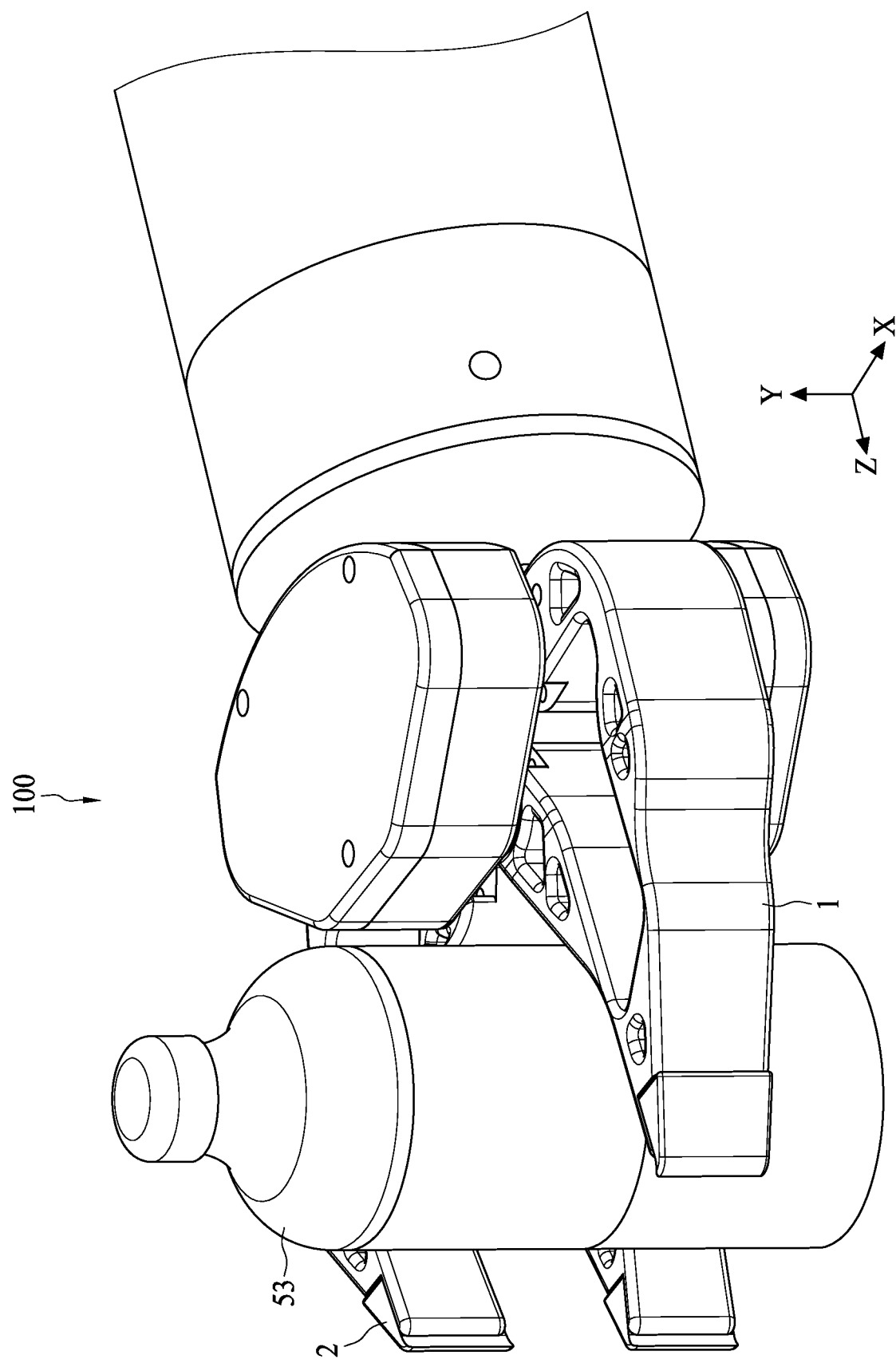
FIG. 8A shows a robotic gripper in accordance with some embodiments of the instant disclosure, wherein the robotic gripper lifts a heavy object, with a coordinate system added for reference.
Figure 8B:
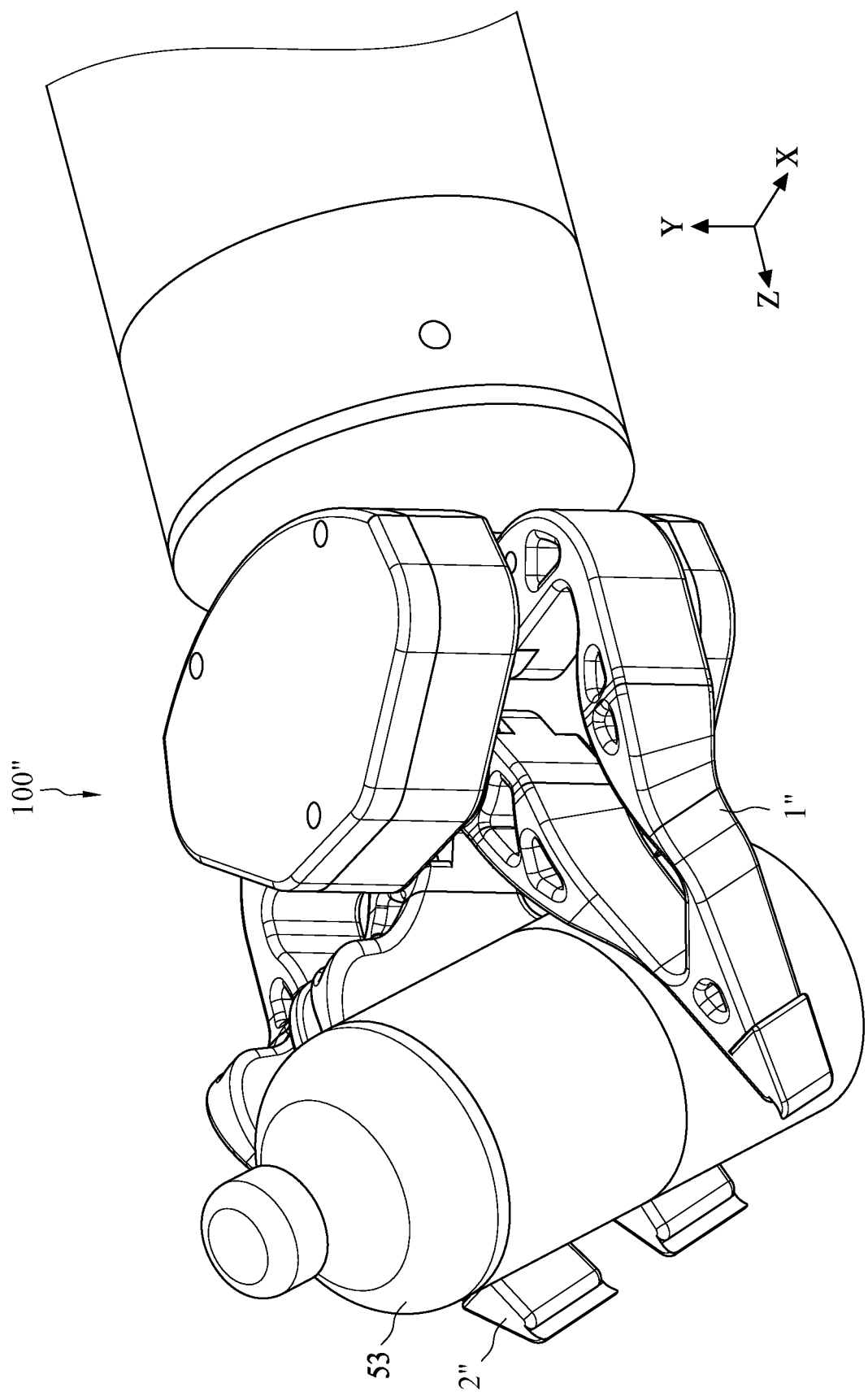
FIG. 8B shows a robotic gripper in accordance with some other embodiments of the instant disclosure, wherein the robotic gripper lifts a heavy object, with a coordinate system added for reference.

Firstly, the X, Y and Z axes shown in FIGS. 8A and 8B use a three-dimensional Cartesian coordinate system. The positive Z-axis may extend in the general direction from the end 111 of the link 11 to the end 133 of the link 13 and can be interpreted to be vertical in the primary linkage plane. The positive X-axis extends in the general direction from the end 142 of the link 14 to the end 112 of the link 11 and can be interpreted to be horizontal in the primary linkage plane. The remaining Y axis is defined the right-hand rule.

FIG. 8A shows that the robotic gripper 100 lifts a heavy object 53. When the robotic gripper 100 lifts a heavy object 53, it may deflect in undesirable ways. As shown in FIG. 8A, the object may exert a frictional force on the surfaces of the robotic fingers 1 and 2. The bending of the robotic fingers 1 and 2 due to gravity is negative in the Y-axis or about the X-axis. Thus, the robotic fingers 1, 2 should be designed as a cantilevered beam with force acting on it at some distance from the body member 3. In order to design the robotic fingers 1 and 2 as a cantilevered beam, the width of the fingers 1 and 2 should be increased in the Y-axis. Moreover, referring to FIG. 2C, the ratio of the distance between the end 133 of the link 13 and the 111 end of the link 11 to the width of the first link 11 ranges substantially, from 3.5 to 6.

FIG. 8B shows that another robotic gripper 100" lifts a heavy object 53. The robotic fingers 1", 2" are not designed as a cantilevered beam with force acting on it at some distance from the body member 3". That is, the width of the fingers 1" and 2" are not varied along the longitudinal axis of the robotic fingers 1" and 2", and thus the fingers 1" and 2" are not configured to be tapered. In such a situation, the fingers 1" and 2" may bend and/or deform in the normal direction (in the Z-axis) when the robotic gripper 100" lifts a heavy object 53.

[Another Exemplary Embodiment of Conforming Mode]

With regard to this embodiment, it shows the torsion of the finger about the Z-axis. The X, Y and Z axes shown in FIG. 9A use a three-dimensional Cartesian coordinate system. The positive Z-axis may extend in the general direction from the end 111 of the link 11 to the end 133 of the link 13 and can be interpreted to be vertical in the primary linkage plane. The positive X-axis extends in the general direction from the end 142 of the link 14 to the end 112 of the link 11 and can be interpreted to be horizontal in the primary linkage plane. The remaining Y axis is defined using the right-hand rule.

Figure 9A:
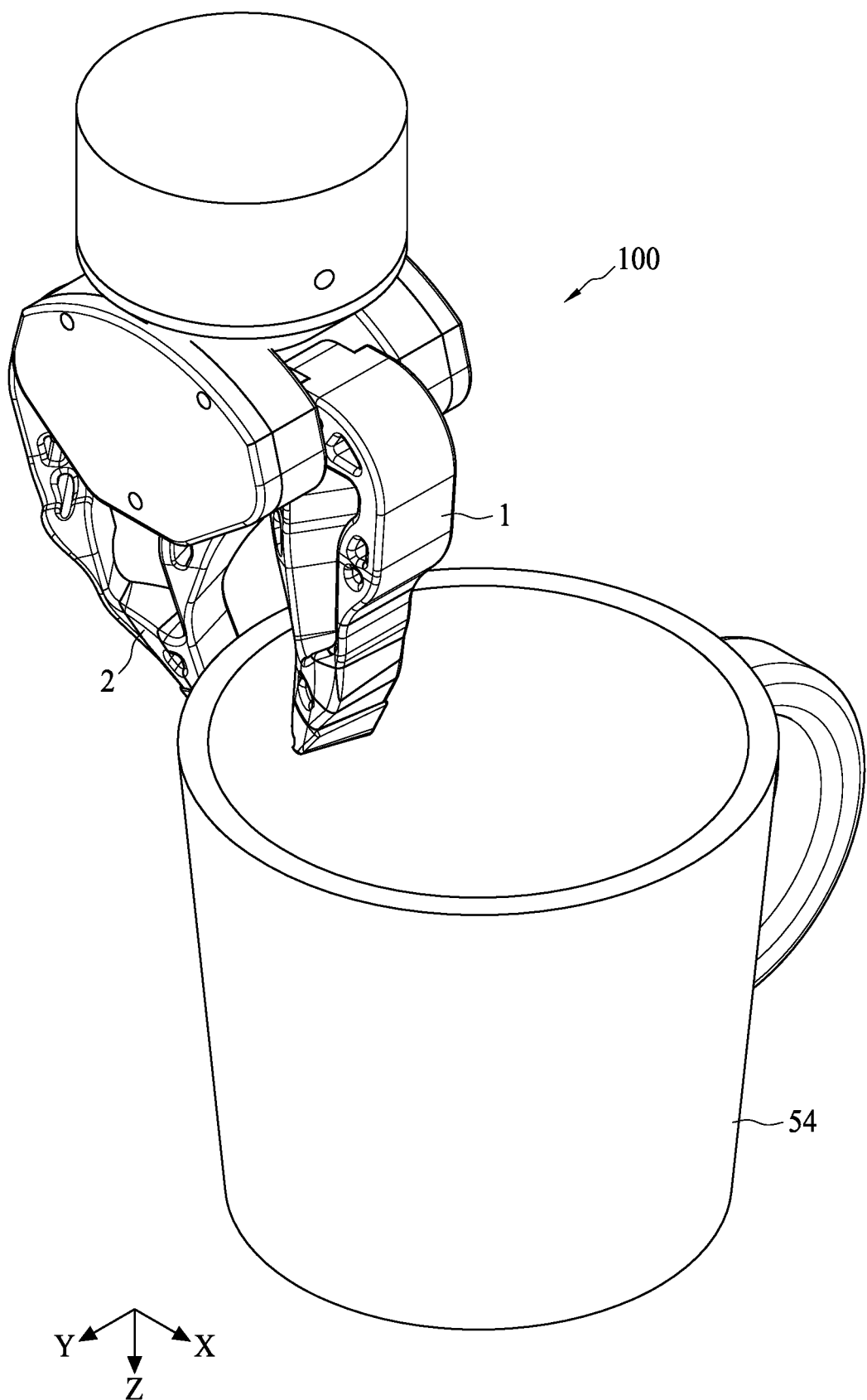
FIG. 9A shows a robotic gripper in accordance with some embodiments of the instant disclosure, wherein the robotic gripper grasps a mug, with a coordinate system added for reference.

Since the robotic fingers 1 and 2 include elastic material, they can conform to most shapes with ease. The robotic fingers 1 and 2 can be twisted along their longitudinal axes such that the contact surfaces of the robotic fingers 1 and 2 can be deformed to be substantially perpendicular to the normal of the outer surface of the object they grasp. Referring to FIG. 9A, the robotic fingers 1 and 2 can deform by twisting about their Z-axes. In particular, the joints 15, 17, 19, 25, 27, 29 are configured to be twisted along their longitudinal axis. The length of the joint 17 may range from three times the smallest thickness of the joint 17 to six times the smallest thickness of the joint 17, and the length of the joint 19 may range from three times the smallest thickness of the joint 19 to six times the smallest thickness of the joint 19, and the length of the joint 27 may range from three times the smallest thickness of the joint 27 to six times the smallest thickness of the joint 27, and the length of the joint 29 may range from three times the smallest thickness of the joint 29 to six times the smallest thickness of the joint 29. As shown in FIG. 9A, when the robotic gripper 100 grasps the mug 54 with the cylindrical surface, the robotic fingers 1 and 2 will twist such that the surface 135 of the link 13 of the robotic finger 1 and the surfaces 235 of the links 23 of the robotic finger 2 will be returned to be perpendicular to the normal of the outer surface of the mug 54. In this way, the robotic fingers 1 and 2 conform to the outer surface of the mug 54, and thus the robotic gripper 100 can grasp the mug 54 in a stable manner.

Figure 9B:
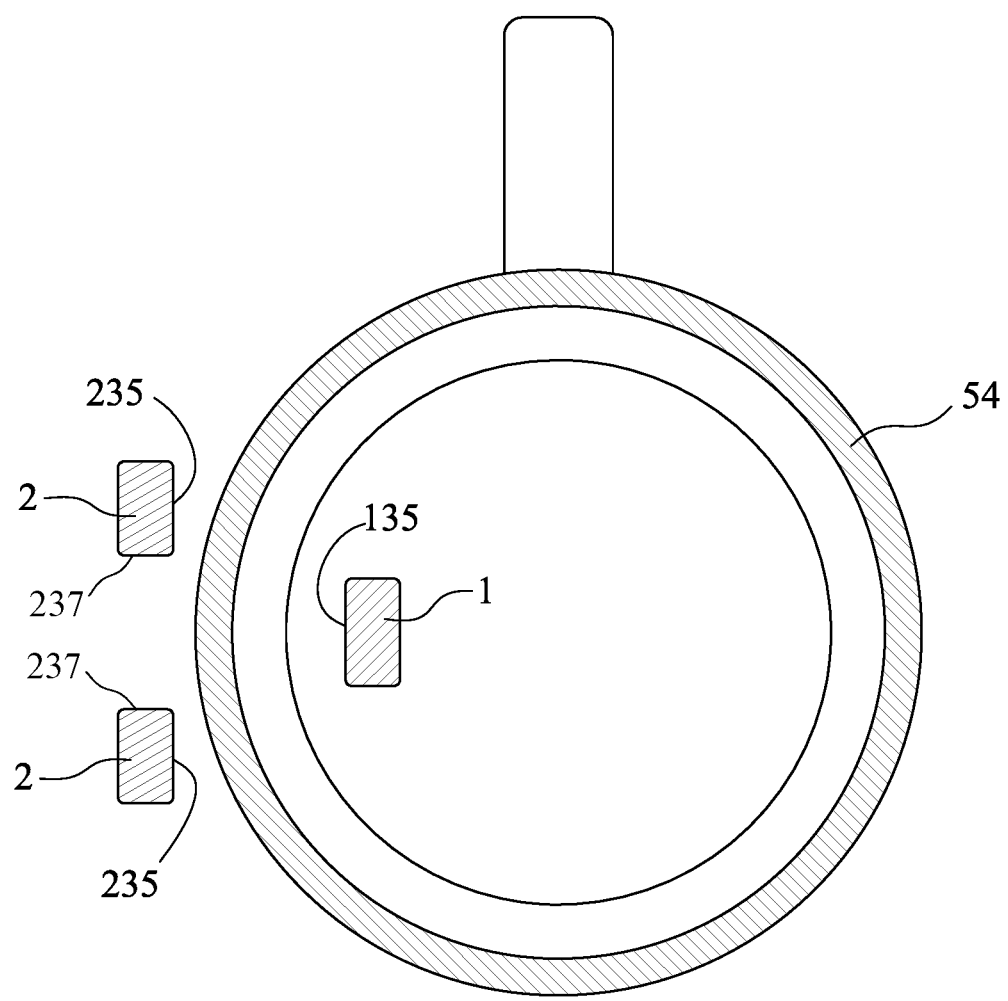
FIGS. 9B and 9C are top schematic views of a robotic gripper in accordance with some other embodiments of the instant disclosure, wherein the robotic gripper grasps a mug.
Figure 9C:
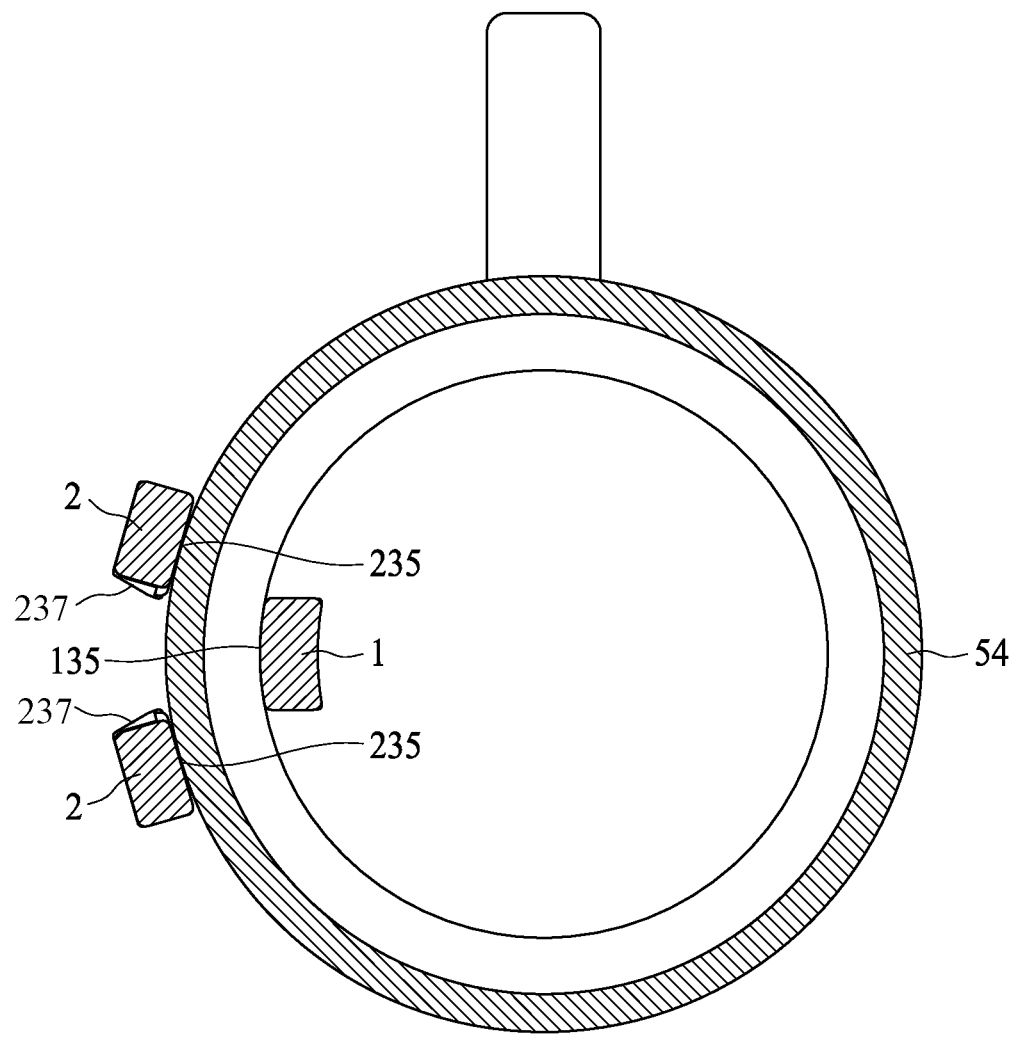

FIGS. 9B and 9C are top schematic views showing grasping movement of the robotic gripper 100.

Referring to FIG. 9B, before grasping the mug 54, the surface 235 of the robotic finger 2 can be substantially flat. The surface 235 of one the robotic finger 2 can be substantially aligned with the surface 235 of another robotic finger 2. The surface 235 of one the robotic finger 2 can be substantially in parallel to the surface 235 of another robotic finger 2. The surface 135 of the robotic finger 1 can be substantially parallel to the surface 235 of the robotic finger 2. The side surface 237 of the robotic finger 2 can substantially flat. The surface 237 of one the robotic finger 2 can be substantially aligned with the surface 237 of another robotic finger 2. The surface 237 of one the robotic finger 2 can be substantially in parallel to the surface 237 of another robotic finger 2.

Referring to FIG. 9C, when grasping the mug 54, the robotic finger 1, which may include elastic or flexible material(s), can be twisted with respect to a longitudinal axis (e.g. the Z axis as shown in FIG. 9A). The side surface or lateral surface 135 of the robotic finger 1 can be deformed to conform to the inner surface of the mug 54 during grasp operation of the robotic gripper 100. The side surface or lateral surface 135 of the robotic finger 1 can be tightly pressed on the inner surface of the mug 54 during grasp operation of the robotic gripper 100. Part of the side surface or lateral surface 135 of the robotic finger 1 can be tightly pressed on the inner surface of the mug 54 during grasp operation of the robotic gripper 100.

The surface 235 of one the robotic finger 2 may not be substantially aligned with the surface 235 of another robotic finger 2. The surface 235 of one the robotic finger 2 may not be substantially in parallel to the surface 235 of another robotic finger 2. The surface 135 of the robotic finger 1 may not be substantially parallel to the surface 235 of the robotic finger 2. The side surface 237 of the robotic finger 2 may not be substantially flat. The surface 237 of one the robotic finger 2 may not be substantially aligned with the surface 237 of another robotic finger 2. The surface 237 of one the robotic finger 2 may not be substantially in parallel to the surface 237 of another robotic finger 2.

Further, the robotic finger 2, which can include elastic or flexible material(s), can be twisted with respect to a longitudinal axis (e.g. the Z axis as shown in FIG. 9A). The side surface or lateral surface 235 of the robotic finger 2 can be deformed to conform to the outer surface of the mug 54 during grasp operation of the robotic gripper 100. Part of the side surface or lateral surface 235 of the robotic finger 2 can be conform to the outer surface of the mug 54 during grasp operation of the robotic gripper 100. The side surface or lateral surface 235 of the robotic finger 2 can be tightly pressed on the outer surface of the mug 54 during grasp operation of the robotic gripper 100. The side surface or lateral surface 235 of the robotic finger 2 can be tightly pressed on the outer surface of the mug 54 during grasp operation of the robotic gripper 100. Part of the side surface or lateral surface 235 of the robotic finger 2 can be tightly pressed on the outer surface of the mug 54 during grasp operation of the robotic gripper 100.

[Another Exemplary Embodiment of Conforming Mode]

Figure 10A:
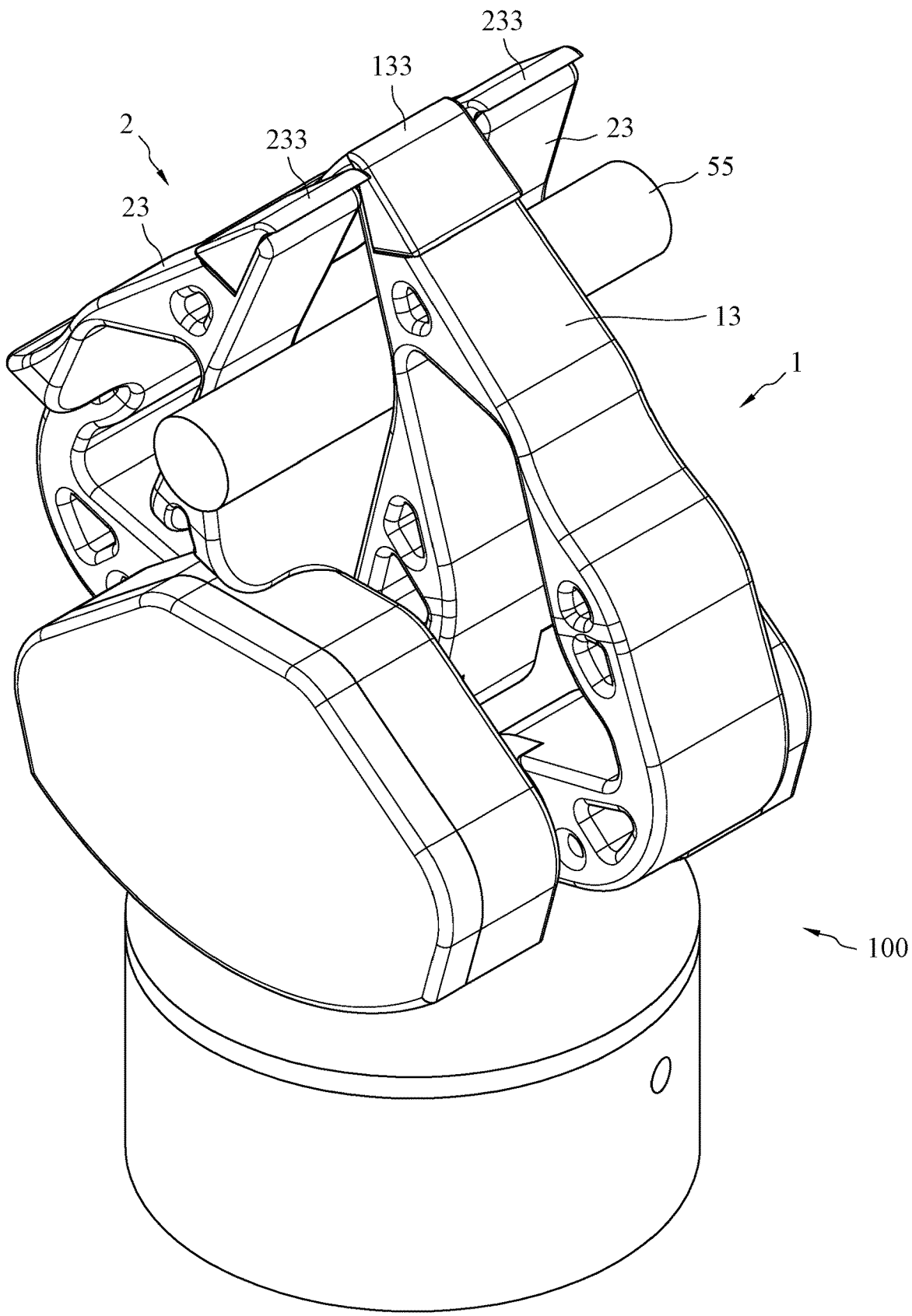
FIG. 10A shows a robotic gripper in accordance with some embodiments of the instant disclosure, wherein the robotic gripper grasps a rod.
Figure 10B:
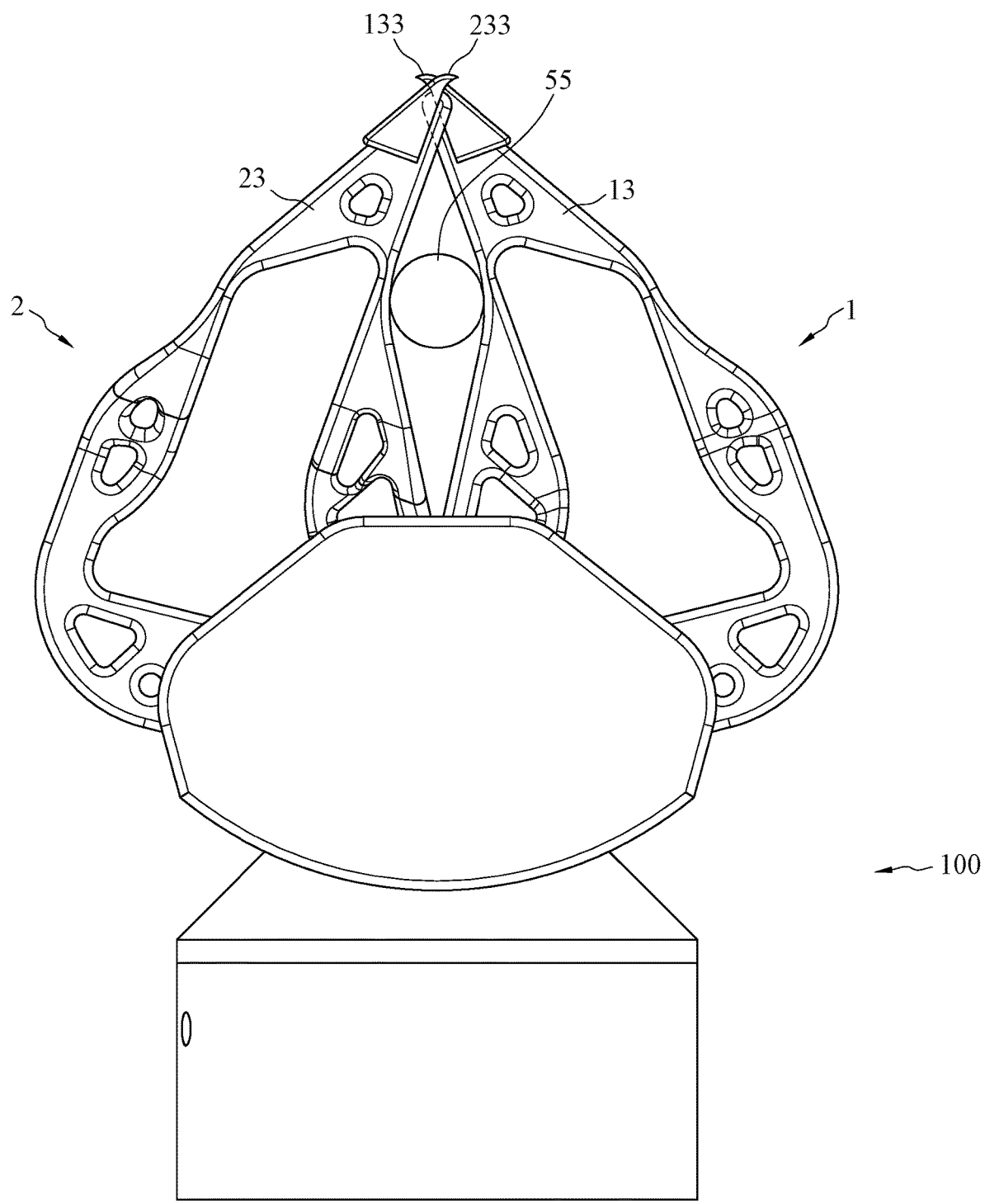
FIG. 10B is a top schematic view of a robotic gripper in accordance with some other embodiments of the instant disclosure, wherein the robotic gripper grasps a rod.

FIGS. 10A and 10B show that the robotic gripper 100 grasps a rod-like object 55 with relatively less diameter or width (e.g. a broom handle). The link 22 of the robotic finger 2 may have two ends 222 connecting to two links 23 respectively. Further, the link 13 of the robotic finger 1 may be configured to correspond to the space between the links 23 of the robotic finger 2. Thus, when the robotic gripper 100 grasps a long, small diameter, rod-like object 55, the link 13 of the robotic finger 1 may pass through the space between the links 23 of the robotic finger 2 such that the long small diameter rod-like object 55 could be fixedly grasped by the robotic gripper 100.

As shown in FIG. 10A, when the robotic gripper 100 grasps the rod-like object 55, the end 133 of the link 13 of the robotic finger 1 may be pass through a space between the ends 233 of the link 23 of the robotic finger 2.

Referring to FIG. 10B, the link 13 of the robotic finger 1 and the links 23 of the robotic finger 2 may be interlaced with each other such that the rod-like object 55 could be held by the robotic fingers 1 and 2.

[Other Embodiments of Robotic Finger]

Figure 11:
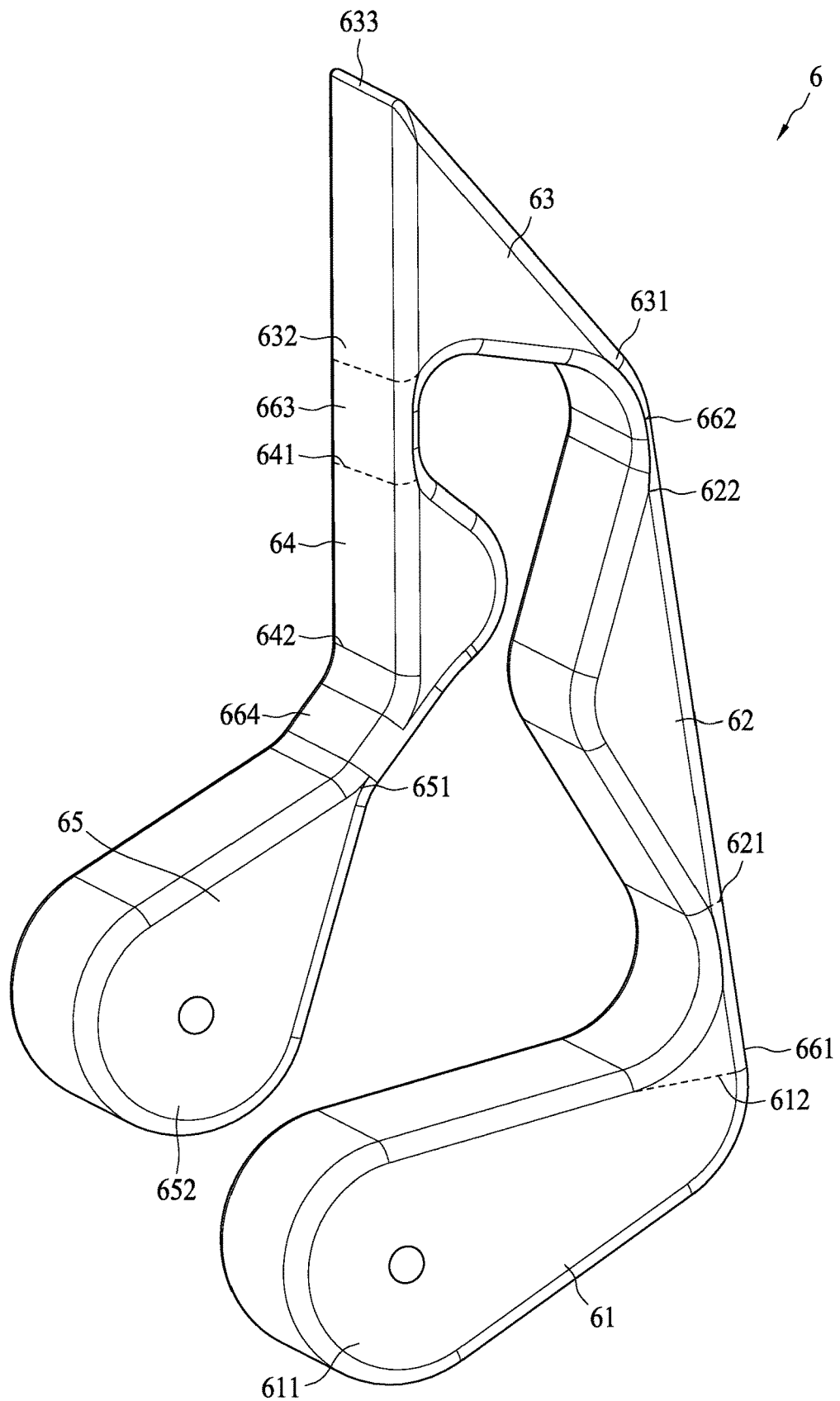
FIG. 11 is a perspective view of a robotic finger in accordance with some other embodiments of the instant disclosure.

FIG. 11 is a perspective view of a robotic finger 6 in accordance with some other embodiments of the instant disclosure. The robotic finger 6 may include five links 61, 62, 63, 64 and 65 and four joints 661, 662, 663 and 664. The link 61 may have two ends 611 and 612 which are opposite to each other. The link 62 may have two ends 621 and 622 which are opposite to each other. The link 63 may have three ends, 631, 632 and 633. The link 64 may have two ends 641 and 642, which are opposite to each other. The link 65 may have two ends 651 and 652 which are opposite to each other. The joint 661 may connect the end 612 of the link 61 and the end 621 of the link 62, and the joint 662 may connect the end 622 of the link 62 and the end 631 of the link 63, the joint 663 may connect the end 632 of the link 63 and the end 641 of the link 64, and the joint 664 may connect the end 642 of the link 64 and the end 651 of the link 65. These links 61, 62, 63, 64 and 65 and these joints 661, 662, 663 and 664 may include elastic material and are formed in one piece, and thus they are configured to be compliant in three dimensions.

Further, the thickness of the end 612 of the link 61 and the thickness of the end 621 of the link 62 may be greater than the smallest thickness of the joint 661. The thickness of the end 622 of the link 62 and the thickness of the end 631 of the link 63 may be greater than the smallest thickness of the joint 662. The thickness of the end 632 of the link 63 and the thickness of the end 641 of the link 64 may be greater than the smallest thickness of the joint 663. The thickness of the end 642 of the link 64 and the thickness of the end 651 of the link 65 may be greater than the smallest thickness of the joint 664. That is, the thickness of the link 61, 62, 63, 64, 65 may be greater than the thickness of the joint 661, 662, 663, 664 to which it connects. Since the joint 661, 662, 663, 664 may have the smaller thickness, the joint 661, 662, 663, 664 will be more flexible and deformable than the link 61, 62, 63, 64, 65. Accordingly, the joints 661, 662, 663, 664 will act as joints connecting the links 61, 62, 63, 64 and 65. That is, the links 61, 62, 63, 64 and 65 can rotate around the joints 661, 662, 663 and 664.

Figure 12:
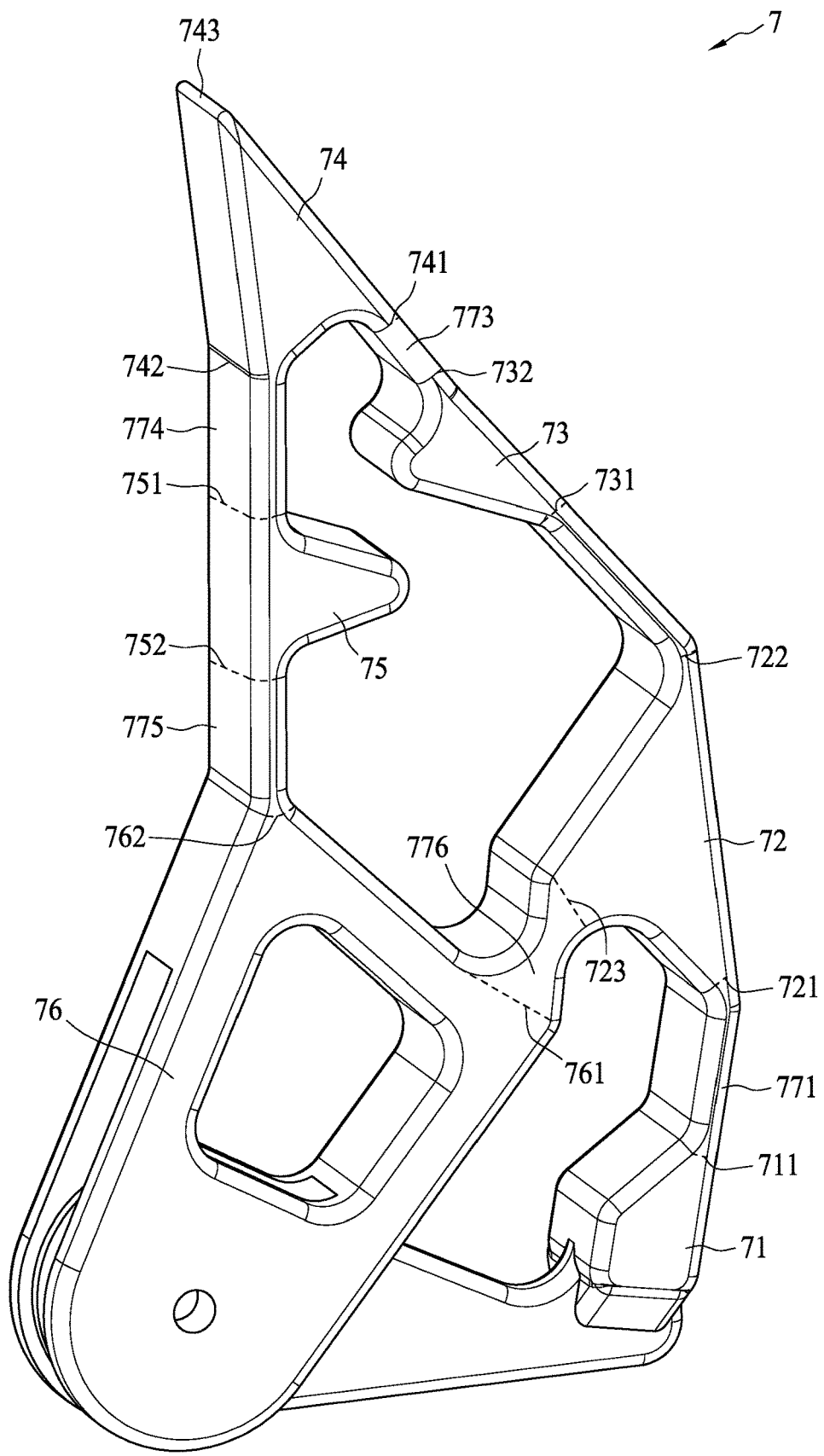
FIG. 12 is a perspective view of a robotic finger in accordance with some other embodiments of the instant disclosure.

FIG. 12 is a perspective view of a robotic finger 7 in accordance with some other embodiments of the instant disclosure. The robotic finger 7 may include six links 71, 72, 73, 74, 75 and 76 and six joints 771, 772, 773, 774, 775 and 776. The joint 771 may connect the end 711 of the link 71. The joint 772 may connect the end 722 of the link 72 and the end 731 of the link 73. The joint 773 may connect the end 732 of the link 73 and the end 741 of the link 74. The joint 774 may connect the end 742 of the link 74 and the end 751 of the link 75. The joint 775 may connect the end 752 of the link 75 and the end 762 of the link 76. The joint 776 may connect the end 723 of the link 72 and the end 761 of the link 76. These links 71, 72, 73, 74, 75 and 76 and these joints 771, 772, 773, 774, 775 and 776 may include elastic material and are formed in one piece, and thus they are configured to be compliant in three dimensions.

Further, the thickness of the end 711 of the link 71 and the thickness of the end 721 of the link 72 may be greater than the smallest thickness of the joint 771. The thickness of the end 722 of the link 72 and the thickness of the end 731 of the link 73 may be greater than the smallest thickness of the joint 772. The thickness of the end 732 of the link 73 and the thickness of the end 741 of the link 74 may be greater than the smallest thickness of the joint 773. The thickness of the end 742 of the link 74 and the thickness of the end 751 of the link 75 may be greater than the smallest thickness of the joint 774. The thickness of the end 752 of the link 75 and the thickness of the end 762 of the link 76 may be greater than the smallest thickness of the joint 775. The thickness of the end 723 of the link 72 and the thickness of the end 761 of the link 76 may be greater than the smallest thickness of the joint 776. That is, the thickness of the link 71, 72, 73, 74, 75, 76 may be greater than the thickness of the joint 771, 772, 773, 774, 775, 776 to which it connects. Since the joint 771, 772, 773, 774, 775, 776 may have the smaller thickness, the joint 771, 772, 773, 774, 775, 776 will be more flexible and deformable than the link 71, 72, 73, 74, 75 and 76. Accordingly, the joints 771, 772, 773, 774, 775 and 776 will be act as joints connecting the links 71, 72, 73, 74, 75 and 76. That is, the links 71, 72, 73, 74, 75 and 76 can rotate around the joints 771, 772, 773, 774, 775 and 776.

Figure 13:
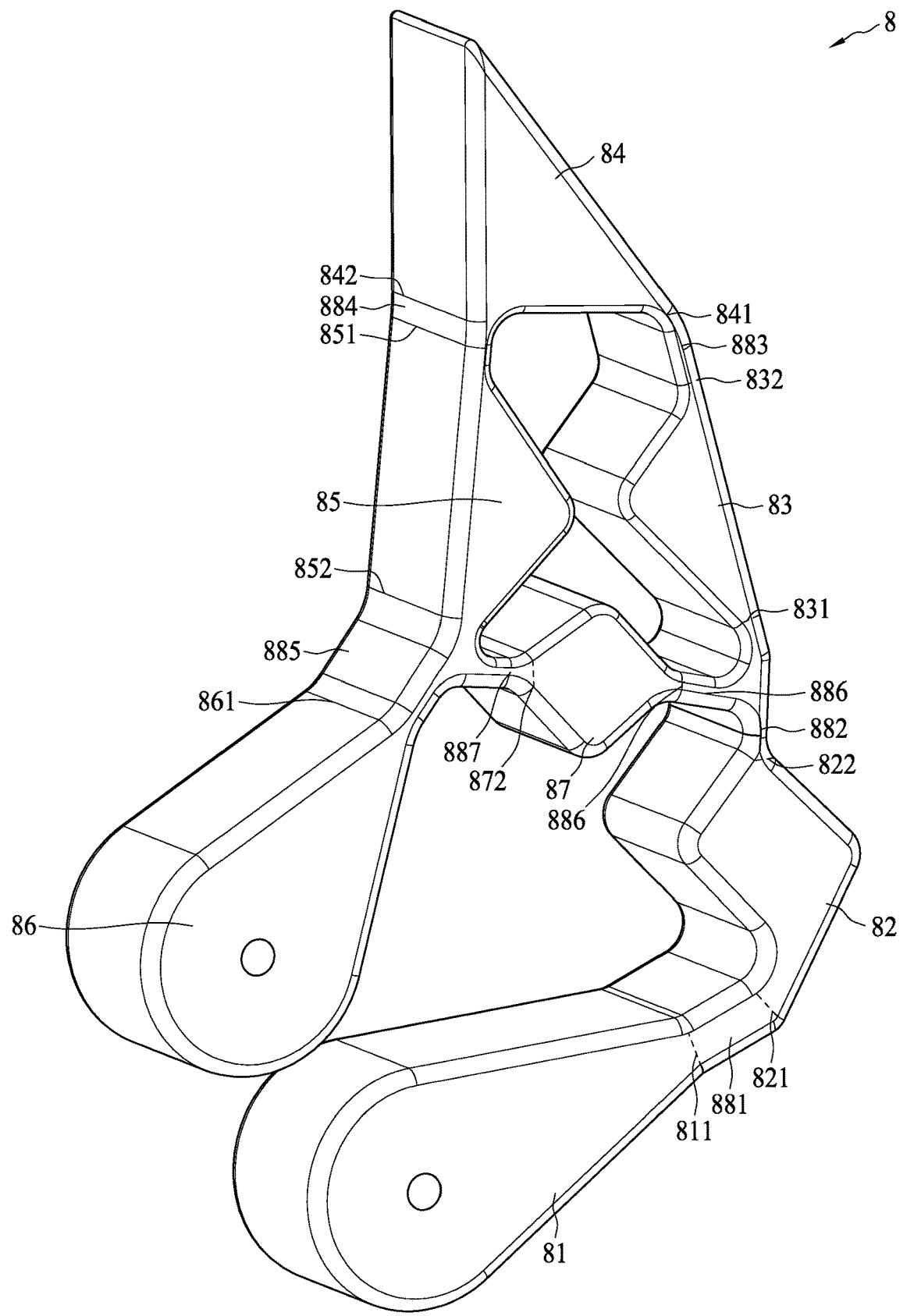
FIG. 13 is a perspective view of a robotic finger in accordance with some other embodiments of the instant disclosure.

FIG. 13 is a perspective view of a robotic finger 8 in accordance with some embodiments of the instant disclosure. The robotic finger 8 may include seven links 81, 82, 83, 84, 85, 86 and 87 and seven joints 881, 882, 883, 884, 885, 886 and 887. The joint 881 may connect the end 811 of the link 81. The joint 882 may connect the end 822 of the link 82 and the end 831 of the link 83. The joint 883 may connect the end 832 of the link 83 and the end 841 of the link 84. The joint 884 may connect the end 842 of the link 84 and the end 851 of the link 85. The joint 885 may connect the end 852 of the link 85 and the end 861 of the link 86. The joint 886 may connect the joint 882 and the end 871 of the link 87. The joint 887 may connect the joint 885 and the end 872 of the link 87. These links 81, 82, 83, 84, 85, 86 and 87 and these joints 881, 882, 883, 884, 885, 886 and 887 may include elastic material and are formed in one piece, and thus they are configured to be compliant in three dimensions.

Further, the thickness of the end 811 of the link 81 and the thickness of the end 821 of the link 82 may be greater than the smallest thickness of the joint 881. The thickness of the end 822 of the link 82 and the thickness of the end 831 of the link 83 may be greater than the smallest thickness of the joint 882. The thickness of the end 832 of the link 83 and the thickness of the end 841 of the link 84 may be greater than the smallest thickness of the joint 883. The thickness of the end 842 of the link 84 and the thickness of the end 851 of the link 85 may be greater than the smallest thickness of the joint 884. The thickness of the end 852 of the link 85 and the thickness of the end 861 of the link 86 may be greater than the smallest thickness of the joint 885. The thickness of the end 871 of the link 87 may be greater than the smallest thickness of the joint 886. The thickness of the end 872 of the link 87 may be greater than the smallest thickness of the joint 887. That is, the thickness of the link 81, 82, 83, 84, 85, 86, 87 may be greater than the thickness of the joint 881, 882, 883, 884, 885, 886, 887 to which it connects. Since the joint 881, 882, 883, 884, 885, 886, 887 may have the smaller thickness, the joint 881, 882, 883, 884, 885, 886, 887 will be more flexible and deformable than the link links 81, 82, 83, 84, 85, 86, 87. Accordingly, the joints 881, 882, 883, 884, 885, 886, 887 will act as joints connecting the links 81, 82, 83, 84, 85, 86 and 87. That is, the links 81, 82, 83, 84, 85, 86 and 87 can rotate around the joints 881, 882, 883, 884, 885, 886 and 887.

Figure 14:
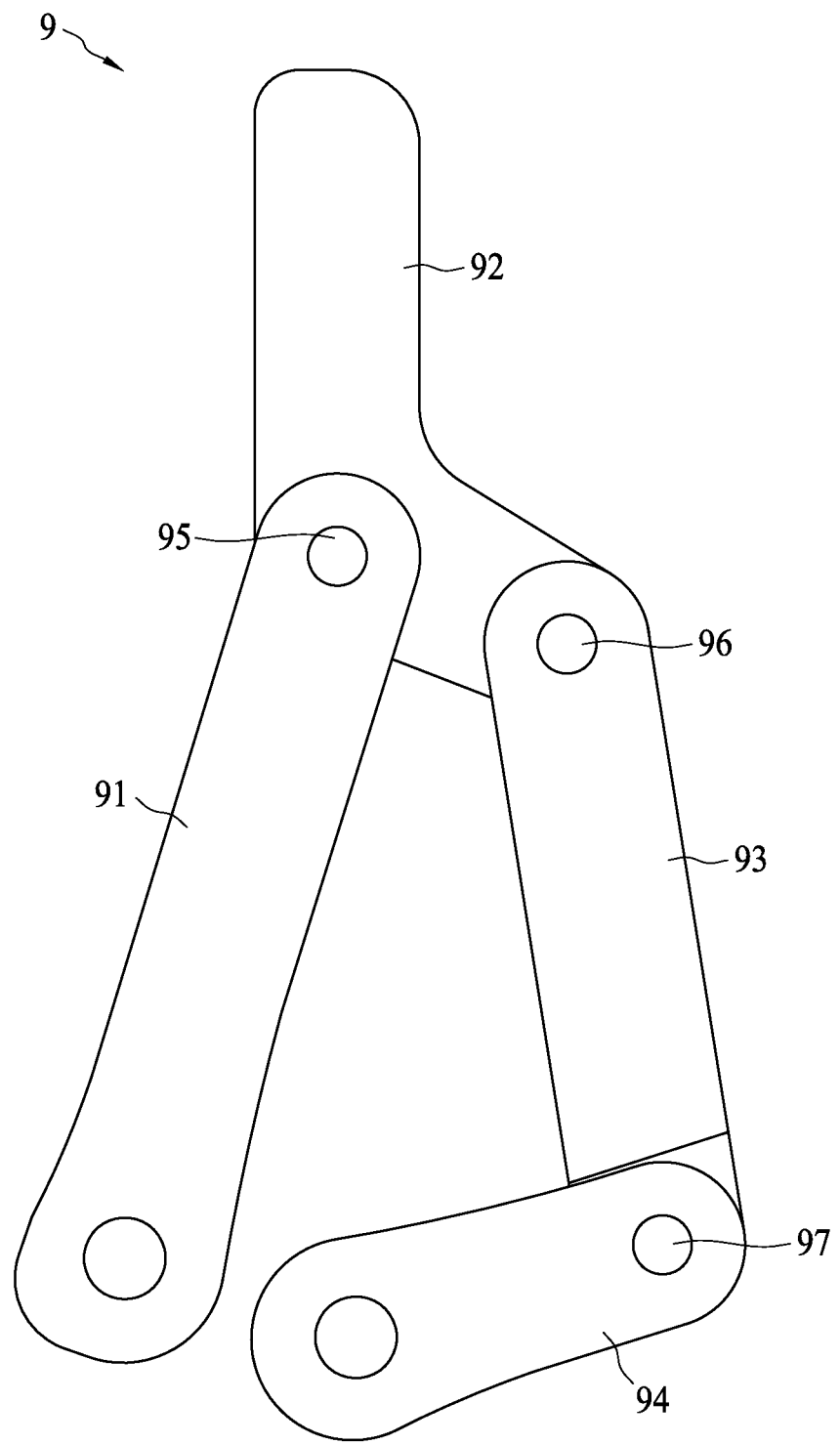
FIG. 14 is a top schematic view of a robotic finger in accordance with some other embodiments of the instant disclosure.

FIG. 14 is a top schematic view of a robotic finger 9 in accordance with some embodiments of the instant disclosure. The robotic finger 9 may include four links 91, 92, 93, and 94. The link 91 is pivotally connected to the link 92 with the connection joint 95. The link 92 is pivotally connected to the link 93 with the connection joint 96. The link 94 is pivotally connected to the link 93 with the connection joint 97. The links 91, 92, 93, 94 and the joints 95, 96, 97 are not formed in one piece and can be made by different materials. Thus, the robotic finger 9 cannot be made by one-time injection molding and the cost for manufacturing the robotic finger 9 will be higher.

As used herein, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event of circumstance occurs precisely as well as instances in which the event or circumstance occurs to a close approximation. As used herein with respect to a given value or range, the terms "approximately", "substantially", "substantial" and "about" generally mean within ±10%, ±5%, ±1%, or ±0.5% of the given value or range. Ranges can be expressed herein as from one endpoint to another endpoint or between two endpoints. All ranges disclosed herein are inclusive of the endpoints, unless specified otherwise. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 µm, no greater than 2 µm, no greater than 1 µm, or no greater than 0.5 µm. A surface can be deemed to be substantially flat if a displacement between a highest point and a lowest point of the surface is no greater than 5 µm, no greater than 2 µm, no greater than 1 µm, or no greater than 0.5 µm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

In addition, if the robotic gripper of the instant disclosure is at much larger or smaller scale, the ratios of the thickness of links and joints, and the finger lengths and widths may be substantially different depending on the elastomeric materials used, and the fact that the cross section of the joints vary as a square (affecting both the spring rates and stiffnesses) while the volume of the links vary as a cube (affecting their mass).

The foregoing outlines feature several embodiments and detailed aspects of the present disclosure. The embodiments described in the present disclosure may be readily used as a basis for designing or modifying other processes and structures for carrying out the same or similar purposes and/or achieving the same or similar advantages of the embodiments introduced herein. For example, numerical values, ratios, geometric description (e.g. shape or contour) as discussed above can be readily used as a basis for designing or modifying other processes and structures for carrying out the same or similar purposes and/or achieving the same or similar advantages of the embodiments introduced herein. Such equivalent constructions do not depart from the spirit and scope of the present disclosure, and various changes, substitutions, and alterations may be made without departing from the spirit and scope of the present disclosure.

The above embodiments merely describe the principle and effects of the present disclosure, instead of limiting the present disclosure. Therefore, persons skilled in the art can make modifications to and variations of the above embodiments without departing from the spirit of the present disclosure. The scope of the present disclosure should be defined by the appended claims.

What is claimed is:

1. A robotic finger, comprising:
    a first link having a first end and a second end;
    a second link having a first end and at least one second end;
    at least one third link having a first end and a second end;
    a fourth link having at least one first end and a second end;
    a first joint between the second end of the first link and the first end of the second link;
    at least one second joint between the second end of the second link and the first end of the third link; and
    at least one third joint between the second end of the third link and the first end of the fourth link;
    wherein the first, second, third and fourth links and the first, second and third joints are comprised of elastic material and are formed in one piece;
    wherein the third link has a third end between the first end of the third link and the second end of the third link, and the third end of the third link is configured to be function as a fingertip of the robotic finger;
    wherein the first end of the first link and the second end of the fourth link are spaced apart from each other.

2. The robotic finger of claim 1, wherein a thickness of the second end of the first link and a thickness of the first end of the second link is greater than a smallest thickness of the first joint, and a thickness of the second end of the second link and a thickness of the first end of the third link is greater than a smallest thickness of the second joint, and a thickness of the second end of the third link and a thickness of the first end of the fourth link is greater than a smallest thickness of the third joint.

3. The robotic finger of claim 2, wherein the smallest thickness of the first joint is greater than the smallest thickness of the second joint and the smallest thickness of the first joint is greater than the smallest thickness of the third joint.

4. The robotic finger of claim 2, wherein the smallest thickness of the first joint ranges from two times the smallest thickness of the second joint to five times the smallest thickness of the second joint or ranges from two times the smallest thickness of the third joint to five times the smallest thickness of the third joint.

5. The robotic finger of claim 2, wherein a length of the second joint ranges from three times the smallest thickness of the second joint to six times the smallest thickness of the second joint, and wherein a length of the third joint ranges from three times the smallest thickness of the third joint to six times the smallest thickness of the third joint.

6. The robotic finger of claim 1, wherein the third link has a third end, and wherein a side face between the second end and the third end of the third link is substantially flat.

7. The robotic finger of claim 6, wherein a width of the second link is substantially tapered toward the second joint, and a width of the second joint is substantially tapered toward the third link, and a width of the third link is substantially tapered toward its third end, and a width of the fourth link is substantially tapered toward the third joint, and a width of the third joint is substantially tapered toward the third link.

8. The robotic finger of claim 1, wherein the second link has two second ends projecting in a branch-shape and connecting to two second joints which connect two first ends of two third links respectively, and wherein the fourth links has two second ends projecting in a branch-shape and connecting to two third joints which connect two second ends of two third links.

9. A robotic finger, comprising:
    a first link having a first end and a second end;
    a second link having a first end and at least one second end;
    at least one third link having a first end and a second end;
    a fourth link having at least one first end and a second end;
    a first joint between the second end of the first link and the first end of the second link;
    at least one second joint between the second end of the second link and the first end of the third link; and
    at least one third joint between the second end of the third link and the first end of the fourth link;
    wherein the first, second, third and fourth links and the first, second and third joints are configured to be compliant in three dimensions;
    wherein the third link has a third end between the first end of the third link and the second end of the third link, and the third end of the third link is configured to be function as a fingertip of the robotic finger;
    wherein the first end of the first link and the second end of the fourth link are spaced apart from each other.

10. The robotic finger of claim 9, wherein the second end of the first link, the first and second ends of the second link, the first and second ends of the third link and the first end of the fourth link are tapered.

11. The robotic finger of claim 10, wherein the first joint has a smallest thickness which is smaller than a thickness of the second end of the first link and a thickness of the first end of the second link, wherein the second joint has a smallest thickness which is smaller than a thickness of the second end of the second link and a thickness of the first end of the third link, and wherein the third joint has a smallest thickness which is smaller than a thickness of the second end of the third link and a thickness of the first end of the fourth link.

12. The robotic finger of claim 11, wherein the smallest thickness of the first joint is greater than the smallest thickness of the second joint and the smallest thickness of the first joint is greater than the smallest thickness of the third joint such that a stiffness of the first joint is greater than a stiffness of the second joint or a stiffness of the third joint.

13. The robotic finger of claim 10, wherein a length of the second joint is substantially equal to six times the smallest thickness of the second joint, and wherein a length of the third joint is substantially equal to six times the smallest thickness of the third joint.

14. The robotic finger of claim 9, wherein the third link has a third end, and wherein a side face between the second end and the third end of the third link is substantially flat.

15. The robotic finger of claim 14, wherein a ratio of a distance between the third end of the third link and the first end of the first link to a width of the first link substantially ranges from 3.5 to 6.

16. The robotic finger of claim 9, wherein the second link has two second ends which project in a branch-shape and connect two second joints connecting to two first ends of two third links respectively, and wherein the fourth links has two second ends which project in a branch-shape and connect two third joints connecting to two second ends of two third links.

17. The method of claim 16, wherein a distance between the first driver and the first idle ground joint is larger than a distance between the second joint and the third joint of the first robotic finger, and wherein a distance between the second driver and the second idle ground joint is larger than a distance between the second joint and the third joint of the second robotic finger.

18. A method for operating a robotic gripper, comprising:
providing a body which has a first driver, a first idle ground joint, a second driver and a second idle ground joint;
providing a first robotic finger, comprising:
a first link having a first end and a second end;
a second link having a first end and at least one second end;
at least one third link having a first end and a second end;
a fourth link having at least one first end and a second end; a first joint between the second end of the first link and the first end of the second link; at least one second joint between the second end of the second link and the first end of the third link; and at least one third joint between the second end of the third link and the first end of the fourth link;
wherein the first, second, third and fourth links and the first, second and third joints are configured to be compliant in three dimensions;
wherein the first end of the first link of the first robotic finger is mounted to one of the first driver and the first idle ground joint, the second end of the fourth link of the first robotic finger is mounted to the other one of the first driver and the first idle ground joint;
providing a second robotic finger, comprising:
a first link having a first end and a second end;
a second link having a first end and at least one second end;
at least one third link having a first end and a second end;
a fourth link having at least one first end and a second end;
a first joint between the second end of the first link and the first end of the second link;
at least one second joint between the second end of the second link and the first end of the third link; and
at least one third joint between the second end of the third link and the first end of the fourth link;
wherein the first, second, third and fourth links and the first, second and third joints are configured to be compliant in three dimensions;
wherein the second end of the fourth link of the second robotic finger is mounted to one of the second driver and the second idle ground joint and the first end of the first link of the second robotic finger is mounted to the other one of the second driver and the second idle ground joint; and
driving the first and second drivers so as to actuate the first and second robotic fingers to perform a pinch grasp or a conforming grasp of an object.

19. The method of claim 18, wherein the third link of the first robotic finger has a third end and the third link of the second robotic finger has a third end, and wherein a side face between the second end and the third end of the third link of the first robotic finger and a side face between the second end and the third end of the third link of the second robotic finger are substantially flat and parallel to each other.

20. The method of claim 18, wherein the second link of the second robotic finger has two second ends projecting in a branch-shape and connecting to two second joints which connect two first ends of two third links of the second robotic finger respectively, and wherein the fourth links of the second robotic finger has two first ends projecting in a branch-shape and connecting to two third joints which connect two second ends of two third links of the second robotic finger.

* * * * *